United States Patent
Sun et al.

(10) Patent No.: US 12,418,454 B2
(45) Date of Patent: Sep. 16, 2025

(54) RESOURCE INFORMATION SENDING METHOD, FIRST NETWORK ELEMENT AND SYSTEM

(71) Applicant: HUAWEI TECHNOLOGIES CO., LTD., Shenzhen (CN)

(72) Inventors: Haiyang Sun, Beijing (CN); Yizhuang Wu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 237 days.

(21) Appl. No.: 17/323,335

(22) Filed: May 18, 2021

(65) Prior Publication Data

US 2021/0274436 A1    Sep. 2, 2021

Related U.S. Application Data

(63) Continuation of application No. PCT/CN2019/116108, filed on Nov. 6, 2019.

(30) Foreign Application Priority Data

Nov. 19, 2018   (CN) .......................... 201811379152.1
Sep. 27, 2019   (CN) .......................... 201910925473.5

(51) Int. Cl.
*H04L 41/0806*    (2022.01)
*H04L 41/0894*    (2022.01)
(Continued)

(52) U.S. Cl.
CPC ...... *H04L 41/0806* (2013.01); *H04L 41/0894* (2022.05); *H04L 41/0895* (2022.05);
(Continued)

(58) Field of Classification Search
None
See application file for complete search history.

(56) References Cited

U.S. PATENT DOCUMENTS

2014/0357258 A1   12/2014   Smith et al.
2017/0085493 A1    3/2017   Senarath et al.
(Continued)

FOREIGN PATENT DOCUMENTS

CN    102131231 A    7/2011
CN    106922002 A    7/2017
(Continued)

OTHER PUBLICATIONS

China Mobile, Huawei, HiSilicon, Solution for Key Issue 4 to assist slice resource allocation and adjustment, SA WG2 Meeting #128bis, S2-188031, Aug. 20-24, 2018, Sophia Antipolis, France, 5 pages.
(Continued)

*Primary Examiner* — Andre Tacdiran
(74) *Attorney, Agent, or Firm* — HAUPTMAN HAM, LLP

(57) ABSTRACT

A resource information sending method includes determining, by a first network element, a remaining resource of a terminal in a first network, and sending, by the first network element to a first policy control network element, information indicating the remaining resource of the terminal in the first network. The first network is at least one of a first data network or a first network slice. The remaining resource is a subscribed resource currently available to the terminal in the first network. The first policy control network element is a policy control network element configured to provide a service for the terminal in the first network.

21 Claims, 19 Drawing Sheets

(51) Int. Cl.
  *H04L 41/0895* (2022.01)
  *H04M 15/00* (2024.01)
  *H04W 28/02* (2009.01)
  *H04W 48/18* (2009.01)
  *H04W 76/11* (2018.01)

(52) U.S. Cl.
  CPC ....... *H04M 15/66* (2013.01); *H04W 28/0268* (2013.01); *H04W 48/18* (2013.01); *H04W 76/11* (2018.02)

(56) References Cited

U.S. PATENT DOCUMENTS

| | | | |
|---|---|---|---|
| 2018/0176900 A1 | 6/2018 | Rong et al. | |
| 2020/0154389 A1* | 5/2020 | Karampatsis | H04L 63/20 |
| 2020/0187106 A1* | 6/2020 | Salkintzis | H04W 4/60 |
| 2021/0168584 A1* | 6/2021 | Li | H04W 48/20 |

FOREIGN PATENT DOCUMENTS

| | | | |
|---|---|---|---|
| CN | 107770794 A | | 3/2018 |
| CN | 108141470 A | | 6/2018 |
| CN | 108337110 A | | 7/2018 |
| CN | 109842910 A | | 6/2019 |
| CN | 110830542 A | | 2/2020 |
| CN | 113162870 A | | 7/2021 |
| EP | 3769485 | * | 3/2018 |
| WO | WO2018157439 | * | 1/2018 |

OTHER PUBLICATIONS

European Search Report issued in corresponding European Application No. 19886813.5, dated Dec. 1, 2021, pp. 1-7, European Patent Office, Munich, Germany.

International Search Report issued in corresponding International Application No. PCT/CN2019/116108, dated Jan. 15, 2020, pp. 1-10.

* cited by examiner

RESOURCE INFORMATION SENDING METHOD, FIRST NETWORK ELEMENT AND SYSTEM

CROSS-REFERENCE TO RELATED APPLICATIONS

This application is a continuation of Application No. PCT/CN2019/116108, filed on Nov. 6, 2019, which claims priority to Chinese Patent Application No. 201811379152.1, filed on Nov. 19, 2018, and Chinese Patent Application No. 201910925473.5, filed on Sep. 27, 2019, the disclosures of the aforementioned applications are hereby incorporated by reference in their entireties.

TECHNICAL FIELD

Embodiments of this application relate to the field of communications technologies, and in particular, to a resource information sending method, first network element and a system.

BACKGROUND

In an existing 5th generation (5G) network, due to a service requirement, a terminal may establish a plurality of protocol data unit (PDU) sessions in a same network slice (NS) and/or a same data network (DN). For different PDU sessions, an access and mobility management function (AMF) network element selects different session management function (SMF) network elements, and different SMF network elements select different policy control function (PCF) network elements, to obtain, from a corresponding PCF network element, a policy and charging control (PCC) rule and another PDU session-related policy. As shown in FIG. 1, a PDU session 1 is established by an SMF network element 1, and the SMF network element 1 selects a PCF network element 1 for the PDU session 1; and a PDU session 2 is established by an SMF network element 2, and the SMF network element 2 selects a PCF network element 2 for the PDU session 2. When formulating the PCC rule and the another PDU session-related policy, the PCF network element determines the PCC rule and the another PDU session-related policy based on a subscribed resource indicated in subscription information obtained from a unified data repository (UDR) network element. In this way, resources are improperly allocated by different PCF network elements to a same terminal in a same network slice and/or a same data network, for example, resources exceed subscribed resources of the terminal in the same network slice and the same data network.

To resolve the foregoing problem, the following solution is used: When an AMF network element detects that a PDU session in a same network slice and a same data network already exists, a solution 1 is that the AMF network element sends a stored PCF ID to an SMF network element, and then the SMF network element selects a PCF network element indicated by the PCF ID.

In the solution 1, a same PCF network element can be selected by the SMF network element in the same network slice and the same data network, thereby avoiding a conflict between a policy formulated by the PCF network element for a plurality of PDU sessions in the same network slice and the same data network and subscription information. However, this solution affects flexibility of PCF network element selection and deployment and has relatively significant impact on a network element function.

SUMMARY

Embodiments of this application provide a resource information sending method and apparatus, to avoid a problem that a conflict occurs between a resource allocated to at least one of a same DN or a same network slice of a same terminal and a subscribed resource of the at least one of the DN or the network slice.

To resolve the foregoing technical problem, the embodiments of this application provide the following technical solutions:

According to a first aspect, at least an embodiment of this application provides a resource information sending method, and the method includes: A first network element determines a remaining resource of a terminal in a first data network DN, a first network element determines a remaining resource of a terminal in a first network slice, or a first network element determines a remaining resource of a terminal in a first DN and a first network slice, where the remaining resource is a subscribed resource currently available for the terminal in the first network (for example, at least one of the first DN and the first network slice). The first network element sends, to a policy control network element (for example, a first policy control network element) that provides a service for the terminal in the first network, information used to indicate the remaining resource.

This embodiment of this application provides the resource information sending method. Because the first network element may determine the remaining resource of the terminal in the first network, and send the remaining resource of the terminal in the first network to a second policy control network element, the second policy control network element may be a policy control network element different from a policy control network element that has allocated a subscribed resource or a policy control network element that subscribes to a remaining resource change notification from the first network element. In other words, it can be ensured that the remaining resource of the terminal in the first network is obtained for different policy control network elements corresponding to a plurality of sessions that are of a same terminal and that correspond to at least one of a same first data network and a same first network slice. Therefore, this can avoid a problem that a conflict occurs between a policy formulated by different policy control network elements for a plurality of PDU sessions that are of a same terminal and that correspond to at least one of a same first network slice and a same first data network and subscription information obtained from a unified database network element.

In some embodiments, a first network element determines a remaining resource of a terminal in a first network includes: The first network element receives an identifier of the terminal, an identifier of the first network, and information used to determine the remaining resource of the terminal in the first network that are from a second network element, and the first network element determines the remaining resource of the terminal in the first network based on the identifier of the terminal, the identifier of the first network, and the information used to determine the remaining resource of the terminal in the first network, where the identifier of the first network includes an identifier of the first data network and an identifier of the first network slice.

In some embodiments, the first network element receives an identifier of the terminal, an identifier of the first network, and information used to determine the remaining resource of the terminal in the first network that are from a second network element includes: The first network element receives the identifier of the terminal, the information used to indicate the remaining resource, and the identifier of the first network that are from the second network element. In this way, the first network element determines, based on the identifier of the terminal and the identifier of the first network, the first network in which the terminal is located, and then determines the remaining resource of the terminal in the first network based on the information used to indicate the remaining resource.

In some embodiments, the first network element receives the identifier of the terminal, the information used to indicate the remaining resource, and the identifier of the first network that are from the second network element specifically includes: The first network element receives a data management creation service operation request or a data management update service operation request from the second network element, where the data management creation service operation request or the data management update service operation request carries the identifier of the terminal, the information used to indicate the remaining resource, and the identifier of the first network. In this way, the first network element may determine the remaining resource of the terminal in the first network by using a data management establishment process or a data management update process.

In some embodiments, a first network element determines a remaining resource of a terminal in a first network includes: The first network element receives an identifier of the first network and information used to determine the remaining resource of the terminal in the first network that are from a second network element, and the first network element determines the remaining resource of the terminal in the first network based on the identifier of the first network and the information used to determine the remaining resource of the terminal in the first network, where the identifier of the first network includes an identifier of the first data network and an identifier of the first network slice.

In some embodiments, the first network element receives an identifier of the first network and information used to determine the remaining resource of the terminal in the first network that are from a second network element includes: The first network element receives the identifier of the first network and the information used to indicate the remaining resource that are from the second network element. In this way, the first network element determines, based on the identifier of the first network, the first network in which the terminal is located, and then determines the remaining resource of the terminal in the first network based on the information used to indicate the remaining resource.

In some embodiments, the first network element receives the identifier of the first network and the information used to indicate the remaining resource that are from the second network element specifically includes: The first network element receives a data management creation service operation request or a data management update service operation request from the second network element, where the data management creation service operation request or the data management update service operation request carries the identifier of the first network and the information used to indicate the remaining resource. In this way, the first network element may determine the remaining resource of the terminal in the first network by using a data management establishment process or a data management update process.

In some embodiments, the method further includes: The first network element receives an identifier of a terminal, at least one of the following information: an identifier of a first DN and an identifier of a first network slice, and information used to indicate a resource that has been allocated by a second policy control network element, where the identifier of the first DN and the identifier of the first network slice, and the information are from a second network element; and that a first network element determines a remaining resource of a terminal in a first network includes: the first network element determines the remaining resource based on a remaining subscribed resource of the terminal in the first network and the resource that has been allocated. In this way, the first network can use the remaining subscribed resource in the first network and the resource that has been allocated to obtain the remaining resource of the terminal in the first network.

In some embodiments, the first network element determines the remaining resource based on a remaining subscribed resource of the terminal in the first network and the resource that has been allocated includes: The first network element determines a difference obtained by subtracting the resource that has been allocated from the remaining subscribed resource of the terminal in the first network as the remaining resource.

In some embodiments, the first network element receives an identifier of a terminal, at least one of the following information: an identifier of a first DN and an identifier of a first network slice, and information used to indicate a resource that has been allocated by a second policy control network element, where the identifier of the terminal, the at least one of the following information: the identifier of the first DN and the identifier of the first network slice, and the information are from a second network element, specifically includes: The first network element receives an event exposure notification service from the second network element, where the event exposure notification service carries the identifier of the terminal, the at least one of the following information: the identifier of the first DN and the identifier of the first network slice, and the information used to indicate the resource that has been allocated by the second policy control network element.

In some embodiments, the method further includes: The first network element receives at least one of the following information: an identifier of a first DN and an identifier of a first network slice, and information used to indicate a resource that has been allocated by a second policy control network element, where the at least one of the following information: the identifier of the first DN and the identifier of the first network slice, and the information are from a second network element; and that a first network element determines a remaining resource of a terminal in a first network includes: the first network element determines the remaining resource based on a remaining subscribed resource of the terminal in the first network and the resource that has been allocated. In this way, the first network can use the remaining subscribed resource in the first network and the resource that has been allocated to obtain the remaining resource of the terminal in the first network.

In some embodiments, the first network element receives at least one of the following information: an identifier of a first DN and an identifier of a first network slice, and information used to indicate a resource that has been allocated by a second policy control network element, where the at least one of the following information: the identifier of the first DN and the identifier of the first network slice, and the information are from a second network element, specifically includes: The first network element receives an event exposure notification service from the second network element, where the event exposure notification service carries the at least one of the following information: the identifier of the first DN and the identifier of the first network slice, and the information used to indicate the resource that has been allocated by the second policy control network element.

In some embodiments, the first network element is any one of a unified data repository UDR, a unified data management UDM, or a binding support function BSF.

In some embodiments, the second network element is a session management network element or the second policy control network element.

In some embodiments, when the second network element is the second policy control network element, that the first network element sends, to a first policy control network element, information used to indicate the remaining resource includes: When the first network element determines that the first policy control network element exists in policy control network elements corresponding to the first network, the first network element sends, to the first policy control network element, the information used to indicate the remaining resource, where the first policy control network element is a policy control network element that is other than the second policy control network element and that is in the policy control network elements corresponding to the first network, or the first policy control network element is a policy control network element that subscribes to a remaining resource change notification from the first network element in the first network.

In some embodiments, when the second network element is the session management network element, the first policy control network element is a policy control network element that subscribes to a remaining resource change notification from the first network element in the first network, or the first policy control network element is a policy control network element corresponding to the first network.

In some embodiments, the resource is a guaranteed bit rate GBR resource, usage information, or attribute information of the first network slice. The attribute information of the first network slice may be specifically a quantity of terminals that can be supported or a quantity of PDU sessions that can be supported. If the resource is the usage information, for usage monitoring (a feature of policy control), a plurality of different policy control network elements corresponding to a same network slice and a same data network may also obtain usage of each other in time. If the resource is the quantity of terminals that can be supported or the quantity of PDU sessions that can be supported, the resource may be a resource supported by the first network (namely, an attribute that is of the first network and that is irrelevant to the terminal), or may be a resource that is allocated by the first network to the current terminal and that is supported by the current terminal. Certainly, the resource may alternatively be another resource-related attribute. This is not limited in this embodiment of this application.

The resource of the terminal in the first network means that the resource in the first network is used to determine or execute a behavior related to the terminal (for example, a GBR resource is authorized, a PDU session is established or deleted, or registration of the terminal is accepted or rejected in this embodiment).

According to a second aspect, at least an embodiment of this application provides a resource information sending method, the method includes: A second network element obtains a resource that has been allocated to a terminal in a first network (for example, the first network is a first DN, or the first network is a first network slice, or the first network is a first DN and a first network slice), and the second network element sends, to a first network element, at least one of the following information: an identifier of the first DN and an identifier of the first network slice, and information used to determine a remaining resource of the terminal in the first network.

At least this embodiment of this application provides the resource information sending method. The second network obtains the resource that has been allocated to the terminal in the first network, and then sends, to the first network element based on the resource that has been allocated, the information used to determine the remaining resource of the terminal in the first network. In this way, the first network element determines the remaining resource of the terminal in the first network. Therefore, the remaining resource of the terminal in the first network is sent to a plurality of corresponding policy control network elements in the first network.

In some embodiments, the second network element sends, to a first network element, at least one of the following information: an identifier of the first DN and an identifier of the first network slice, and information used to determine a remaining resource of the terminal in the first network further includes: The second network element sends an identifier of the terminal to the first network element.

In some embodiments, the information used to determine the remaining resource of the terminal in the first network is information used to indicate the remaining resource. In this way, the first network element determines the remaining resource based on the information used to indicate the remaining resource.

In some embodiments, the second network element sends, to a first network element, at least one of the following information: an identifier of the first DN and an identifier of the first network slice, and information used to determine a remaining resource of the terminal in the first network specifically includes: The second network element sends a data management creation service operation request or a data management update service operation request to the first network element, where the data management creation service operation request or the data management update service operation request carries the at least one of the following information: the identifier of the first DN and the identifier of the first network slice, and the information used to indicate the remaining resource.

In some embodiments, the data management creation service operation request or the data management update service operation request further carries the identifier of the terminal.

In some embodiments, the information used to determine the remaining resource of the terminal in the first network is information used to indicate a resource that has been allocated by a second policy control network element. In this way, the first network element determines the remaining resource of the terminal in the first network based on the resource that has been allocated.

In some embodiments, the second network element sends, to a first network element, at least one of the following information: an identifier of the first DN and an identifier of the first network slice, and information used to determine a remaining resource of the terminal in the first network specifically includes: The second network element sends an event exposure notification service to the first network element, where the event exposure notification service carries the identifier of the terminal, the at least one of the following information: the identifier of the first DN and the identifier of the first network slice, and the information used to indicate the resource that has been allocated by the second policy control network element.

In some embodiments, the event exposure notification service further carries the identifier of the terminal.

In some embodiments, the second network element is the second policy control network element or a session management network element, and the first network element is any one of a unified data repository UDR, a unified data management UDM, or a binding support function BSF.

In some embodiments, when the second network element is the session management network element, that a second network element obtains a resource that has been allocated to a terminal in a first network includes: The second network element receives the resource that is from the second policy control network element and that has been allocated to the terminal in the first network.

In some embodiments, the resource is a guaranteed bit rate GBR resource, usage information, or attribute information of the first network slice.

According to a third aspect, at least an embodiment of this application provides a resource information sending method, and the method includes: An access device obtains a resource that has been allocated to a terminal in a first network (for example, the first network is a first DN, or the first network is a first network slice, or the first network is a first DN and a first network slice), the access device determines a remaining resource of the terminal in the first network based on a remaining subscribed resource of the terminal in the first network and the resource that has been allocated, and the access device sends, to a session management network element, information used to indicate the remaining resource.

In some embodiments, the access device sends, to a session management network element, information used to indicate the remaining resource includes: When the remaining resource is less than or equal to a preset threshold, the access device sends the information used to indicate the remaining resource to the session management network element.

In some embodiments, the resource is a guaranteed bit rate GBR resource, usage information, or attribute information of the first network slice.

In some embodiments, the method further includes: The access device obtains subscribed resource of the terminal in the first network.

In some embodiments, a process in which the terminal registers with a network, the access device obtains the subscribed resource of the terminal in the first network from UDM or a policy control network element through an AMF network element.

In some embodiments, the access device sends, to a session management network element, information used to indicate the remaining resource includes: The access device sends, through the AMF network element, the information used to indicate the remaining resource to the session management network element corresponding to the first network.

According to a fourth aspect, at least an embodiment of this application provides a resource information obtaining method, the method includes: A session management network element obtains information used to indicate a remaining resource; and the session management network element sends first indication information to a policy control network element, where the first indication information is used to determine the remaining resource, or is used to indicate a relationship between the remaining resource in a first network and a preset threshold.

In some embodiments, the session management network element obtains information used to indicate a remaining resource includes: The session management network element obtains, from an access device through an AMF network element, the information used to indicate the remaining resource.

In some embodiments, when the session management network element determines that the remaining resource is less than or equal to the preset threshold, the first indication information is used to indicate that the remaining resource is less than or equal to the preset threshold. When the session management network element determines that the remaining resource is greater than the preset threshold, the first indication information is used to indicate that the remaining resource is greater than the preset threshold.

In some embodiments, the first network corresponds to a plurality of sessions, and the plurality of sessions correspond to different policy control network elements.

According to a fifth aspect, at least an embodiment of this application provides a resource information obtaining method, the method includes: A first policy control network element receives information that is from a first network element and that is used to indicate a remaining resource; and the first policy control network element makes a policy decision based on the information used to indicate the remaining resource.

In some embodiments, the first policy control network element is a policy control network element corresponding to the first network, or the first policy control network element is a policy control network element that subscribes to a remaining resource change notification from the first network element.

According to a sixth aspect, at least an embodiment of this application provides a resource information sending apparatus. The resource information sending apparatus may be a first network element, or may be a chip used in a first network element. The resource information sending apparatus has a function of implementing the resource information sending method described in the first aspect. The function may be implemented by hardware, or may be implemented by hardware executing corresponding software. The hardware or the software includes one or more modules corresponding to the function.

According to a seventh aspect, a resource information sending apparatus is provided. The resource information sending apparatus may be a first network element, or may be a chip used in a first network element. The resource information sending apparatus includes at least one processor and an interface circuit. When the resource information sending apparatus runs, the processor executes computer-executable instructions stored in the resource information sending apparatus, to enable the resource information sending apparatus to perform the resource information sending method according to any one of the first aspect or the possible implementations of the first aspect.

In some embodiments, the resource information sending apparatus described in the seventh aspect may further include a bus and a memory. The memory is configured to store code and data.

In some embodiments, the at least one processor, the interface circuit, and the memory are coupled to each other.

According to an eighth aspect, at least an embodiment of this application provides a resource information sending apparatus. The resource information sending apparatus may be a second network element, or may be a chip used in a second network element. The resource information sending apparatus has a function of implementing the resource information sending method described in the second aspect. The function may be implemented by hardware, or may be implemented by hardware executing corresponding software. The hardware or the software includes one or more modules corresponding to the function.

According to a ninth aspect, a resource information sending apparatus is provided. The resource information sending apparatus may be a second network element, or may be a chip used in a second network element. The resource information sending apparatus includes at least one processor and an interface circuit. When the resource information sending apparatus runs, the processor executes computer-executable instructions stored in the resource information sending apparatus, to enable the resource information sending apparatus to perform the resource information sending method according to any one of the second aspect or the possible implementations of the second aspect.

In some embodiments, the resource information sending apparatus described in the ninth aspect may further include a bus and a memory. The memory is configured to store code and data.

In some embodiments, the at least one processor, the interface circuit, and the memory are coupled to each other.

According to a tenth aspect, at least an embodiment of this application provides a resource information sending apparatus. The resource information sending apparatus may be an access device, or may be a chip used in an access device. The resource information sending apparatus has a function of implementing the resource information sending method described in the third aspect. The function may be implemented by hardware, or may be implemented by hardware executing corresponding software. The hardware or the software includes one or more modules corresponding to the function.

According to an eleventh aspect, a resource information sending apparatus is provided. The resource information sending apparatus may be an access device, or may be a chip used in an access device. The resource information sending apparatus includes at least one processor and an interface circuit. When the resource information sending apparatus runs, the processor executes computer-executable instructions stored in the resource information sending apparatus, to enable the resource information sending apparatus to perform the resource information sending method according to any one of the third aspect or the possible implementations of the third aspect.

In some embodiments, the resource information sending apparatus described in the eleventh aspect may further include a bus and a memory. The memory is configured to store code and data.

In some embodiments, the at least one processor, the interface circuit, and the memory are coupled to each other.

According to a twelfth aspect, at least an embodiment of this application provides a resource information obtaining apparatus. The resource information obtaining apparatus may be a session management network element, or may be a chip used in a session management network element. The resource information obtaining apparatus has a function of implementing the resource information obtaining method described in the fourth aspect. The function may be implemented by hardware, or may be implemented by hardware executing corresponding software. The hardware or the software includes one or more modules corresponding to the function.

According to a thirteenth aspect, a resource information obtaining apparatus is provided. The resource information obtaining apparatus may be a session management network element, or may be a chip used in a session management network element. The resource information obtaining apparatus includes at least one processor and an interface circuit. When the resource information obtaining apparatus runs, the processor executes computer-executable instructions stored in the resource information obtaining apparatus, to enable the resource information obtaining apparatus to perform the resource information obtaining method according to any one of the fourth aspect or the possible implementations of the fourth aspect.

In some embodiments, the resource information obtaining apparatus described in the thirteenth aspect may further include a bus and a memory. The memory is configured to store code and data.

In some embodiments, the at least one processor, the interface circuit, and the memory are coupled to each other.

According to a fourteenth aspect, at least an embodiment of this application provides a resource information obtaining apparatus. The resource information obtaining apparatus may be a first policy control network element, or may be a chip used in a first policy control network element. The resource information obtaining apparatus has a function of implementing the resource information obtaining method described in the fifth aspect. The function may be implemented by hardware, or may be implemented by hardware executing corresponding software. The hardware or the software includes one or more modules corresponding to the function.

According to a fifteenth aspect, a resource information obtaining apparatus is provided. The resource information obtaining apparatus may be a first policy control network element, or may be a chip used in a first policy control network element. The resource information obtaining apparatus includes at least one processor and an interface circuit. When the resource information obtaining apparatus runs, the processor executes computer-executable instructions stored in the resource information obtaining apparatus, to enable the resource information sending apparatus to perform the resource information obtaining method according to any one of the fifth aspect or the possible implementations of the fifth aspect.

In some embodiments, the resource information sending apparatus described in the fifteenth aspect may further include a bus and a memory. The memory is configured to store code and data.

In some embodiments, the at least one processor, the interface circuit, and the memory are coupled to each other.

According to a sixteenth aspect, a computer-readable storage medium is provided. The computer-readable storage medium stores instructions; and when the instructions are run on a computer, the computer is enabled to perform the resource information sending method described in any one of the first aspect or the possible implementations of the first aspect.

According to a seventeenth aspect, a computer-readable storage medium is provided. The computer-readable storage medium stores instructions; and when the instructions are run on a computer, the computer is enabled to perform the resource information sending method described in any one of the second aspect or the possible implementations of the second aspect.

According to an eighteenth aspect, a computer-readable storage medium is provided. The computer-readable storage medium stores instructions; and when the instructions are run on a computer, the computer is enabled to perform the resource information sending method described in any one of the third aspect or the possible implementations of the third aspect.

According to a nineteenth aspect, a computer-readable storage medium is provided. The computer-readable storage medium stores instructions; and when the instructions are run on a computer, the computer is enabled to perform the resource information obtaining method described in any one of the fourth aspect or the possible implementations of the fourth aspect.

According to a twentieth aspect, a computer-readable storage medium is provided. The computer-readable storage medium stores instructions; and when the instructions are run on a computer, the computer is enabled to perform the resource information obtaining method described in any one of the fifth aspect or the possible implementations of the fifth aspect.

According to a twenty-first aspect, a computer program product including instructions is provided. When the computer program product runs on a computer, the computer is enabled to perform the resource information sending method described in any one of the first aspect or the possible implementations of the first aspect.

According to a twenty-second aspect, a computer program product including instructions is provided. When the computer program product runs on a computer, the computer is enabled to perform the resource information sending method described in any one of the second aspect or the possible implementations of the second aspect.

According to a twenty-third aspect, a computer program product including instructions is provided. When the computer program product runs on a computer, the computer is enabled to perform the resource information sending method described in any one of the third aspect or the possible implementations of the third aspect.

According to a twenty-fourth aspect, a computer program product including instructions is provided. When the computer program product runs on a computer, the computer is enabled to perform the resource information obtaining method described in any one of the fourth aspect or the possible implementations of the fourth aspect.

According to a twenty-fifth aspect, a computer program product including instructions is provided. When the computer program product runs on a computer, the computer is enabled to perform the resource information obtaining method described in any one of the fifth aspect or the possible implementations of the fifth aspect.

According to a twenty-sixth aspect, this application provides a chip, used in a resource information sending apparatus. The chip includes at least one processor and a communications interface. The communications interface is coupled to the at least one processor. The processor is configured to run a computer program or instructions, to perform the method according to any one of the first aspect or the possible implementations of the first aspect. The communications interface is configured to communicate with another module outside the chip.

According to a twenty-seventh aspect, this application provides a chip, used in a resource information sending apparatus. The chip includes at least one processor and a communications interface. The communications interface is coupled to the at least one processor. The processor is configured to run a computer program or instructions, to perform the method according to any one of the second aspect or the possible implementations of the second aspect. The communications interface is configured to communicate with another module outside the chip.

According to a twenty-eighth aspect, this application provides a chip, used in a resource information sending apparatus. The chip includes at least one processor and a communications interface. The communications interface is coupled to the at least one processor. The processor is configured to run a computer program or instructions, to perform the method according to any one of the third aspect or the possible implementations of the third aspect. The communications interface is configured to communicate with another module outside the chip.

According to a twenty-ninth aspect, this application provides a chip, used in a resource information obtaining apparatus. The chip includes at least one processor and a communications interface. The communications interface is coupled to the at least one processor. The processor is configured to run a computer program or instructions, to perform the method according to any one of the fourth aspect or the possible implementations of the fourth aspect. The communications interface is configured to communicate with another module outside the chip.

According to a thirtieth aspect, this application provides a chip, used in a resource information obtaining apparatus. The chip includes at least one processor and a communications interface. The communications interface is coupled to the at least one processor. The processor is configured to run a computer program or instructions, to perform the method according to any one of the fifth aspect or the possible implementations of the fifth aspect. The communications interface is configured to communicate with another module outside the chip.

In some embodiments, the chip described in this application may further include at least one memory, and the at least one memory stores instructions or a computer program.

According to a thirty-first aspect, a communications system is provided. The communications system includes: a second network element, configured to: obtain a resource that has been allocated to a terminal in a first network, and send, to a first network element, an identifier of the first network and information used to determine a remaining resource of the terminal in the first network, where the first network includes at least one of a first data network DN and a first network slice, and the identifier of the first network includes at least one of an identifier of the first DN and an identifier of the first network slice; and the first network element, configured to: determine the remaining resource of the terminal in the first network, and send, to a first policy control network element, the information used to indicate the remaining resource of the terminal in the first network, where the first policy control network element is a policy control network element that provides a service for the terminal in the first network.

In some embodiments, the second network element is further configured to send an identifier of the terminal to the first network element.

In some embodiments, the first network element is specifically configured to receive the identifier of the first network and the information used to determine the remaining resource of the terminal in the first network that are from the second network element, to determine the remaining resource of the terminal in the first network. In some embodiments, the first network element is specifically configured to receive the information used to determine the identifier of the terminal, the identifier of the first network, and the remaining resource of the terminal in the first network that are from the second network element, to determine the remaining resource of the terminal in the first network.

In some embodiments, the information used to determine the remaining resource of the terminal in the first network is information used to indicate the remaining resource; and correspondingly, the first network element is specifically configured to receive the identifier of the first network and the information used to indicate the remaining resource that are from the second network element.

In some embodiments, the first network element is specifically configured to receive a data management creation service operation request or a data management update service operation request from the second network element, where the data management creation service operation request or the data management update service operation request carries the identifier of the first network and the information used to indicate the remaining resource.

In some embodiments, the data management creation service operation request or the data management update service operation request further carries the identifier of the terminal.

In some embodiments, the information used to determine the remaining resource of the terminal in the first network is information used to indicate a resource that has been allocated by a second policy control network element; and correspondingly, the first network element is specifically configured to receive the identifier of the first network and the information used to indicate the resource that has been allocated by the second policy control network element, where the identifier of the first network and the information are from the second network element; and the first network element is specifically configured to determine the remaining resource based on a remaining subscribed resource of the terminal in the first network and the resource that has been allocated. In a possible implementation, the first network element is specifically configured to receive the identifier of the terminal, the identifier of the first network, and the information used to indicate the resource that has been allocated by the second policy control network element, where the identifier of the terminal, the identifier of the first network, and the information are from the second network element.

In some embodiments, the first network element is specifically configured to receive an event exposure notification service from the second network element, where the event exposure notification service carries the identifier of the first network and the information used to indicate the resource that has been allocated by the second policy control network element.

In some embodiments, the event exposure notification service may further carry the identifier of the terminal.

In some embodiments, the first network element is any one of a unified data repository UDR, a unified data management UDM, or a binding support function BSF. The second network element is a session management network element or the second policy control network element.

In some embodiments, when the second network element is the second policy control network element, and the first network element is specifically configured to determine that the first policy control network element exists in policy control network elements corresponding to the first network, the first network element sends, to the first policy control network element, the information used to indicate the remaining resource, where the first policy control network element is a policy control network element that is other than the second policy control network element and that is in the policy control network elements corresponding to the first network, or the first policy control network element is a policy control network element that subscribes to a remaining resource change notification from the first network element in the first network.

According to a thirty-second aspect, a chip system is provided. The chip system includes: a memory, configured to store a computer program; and a processor, configured to invoke the computer program from the memory and run the computer program, to enable a device on which the chip system is installed to perform the method described in any one of the foregoing aspects.

In addition, for technical effects brought by any design manner of the second aspect to the thirty-second aspect, refer to technical effects brought by different design manners of the first aspect. Details are not described herein again.

These aspects or other aspects of this application are clearer and more comprehensible in descriptions of the following embodiments.

DESCRIPTION OF EMBODIMENTS

Figure 1:
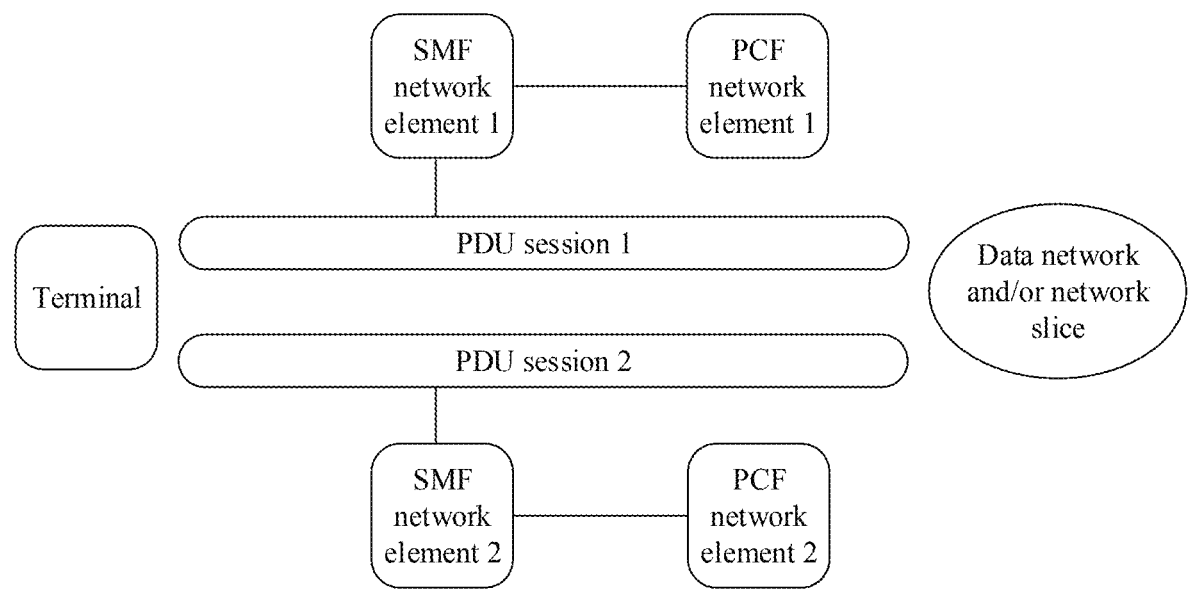
FIG. 1 is a schematic diagram of establishing a plurality of PDU sessions in a same DN and a same network slice.

To clearly describe the technical solutions in the embodiments of this application, terms such as "first" and "second" are used in the embodiments of this application to distinguish between same items or similar items that have basically same functions and purposes. For example, a first policy control network element and a second policy control network element are merely intended to distinguish between different policy control network elements, and are not intended to limit a sequence of the first policy control network element and the second policy control network element. A person skilled in the art may understand that the terms such as "first" and "second" do not limit a quantity or an execution sequence, and the terms such as "first" and "second" do not indicate a definite difference.

It should be noted that in this application, the word such as "example" or "for example" is used to represent giving an example, an illustration, or a description. Any embodiment or design scheme described as an "example" or "for example" in this application should not be explained as being more preferred or having more advantages than another embodiment or design scheme. Exactly, use of the words such as "example" or "for example" is intended to present a related concept in a specific manner.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that the technical solutions provided in the embodiments of this application are also applicable to similar technical problems as the network architecture evolves and a new service scenario emerges.

In this application, "at least one" means one or more, and "a plurality of" means two or more. The term "and/or" describes an association relationship for describing associated objects and represents that three relationships may exist. For example, A and/or B may represent the following cases: Only A exists, both A and B exist, and only B exists, where A and B may be singular or plural. The character "/" usually represents an "or" relationship between the associated objects. "At least one of the following" or a similar expression thereof indicates any combination of the following, and includes any combination of one or more of the following. For example, at least one of a, b, or c may indicate: a, b, c, a and b, a and c, b and c, or a, b, and c, where a, b, and c may be singular or plural.

The system architecture and the service scenario described in the embodiments of this application are intended to describe the technical solutions in the embodiments of this application more clearly, and do not constitute a limitation on the technical solutions provided in the embodiments of this application. A person of ordinary skill in the art may know that the technical solutions provided in the embodiments of this application are also applicable to similar technical problems as the network architecture evolves and a new service scenario emerges. In the embodiments of this application, an example in which a provided method is applied to an NR system or a 5G network is used for description.

Figure 2:
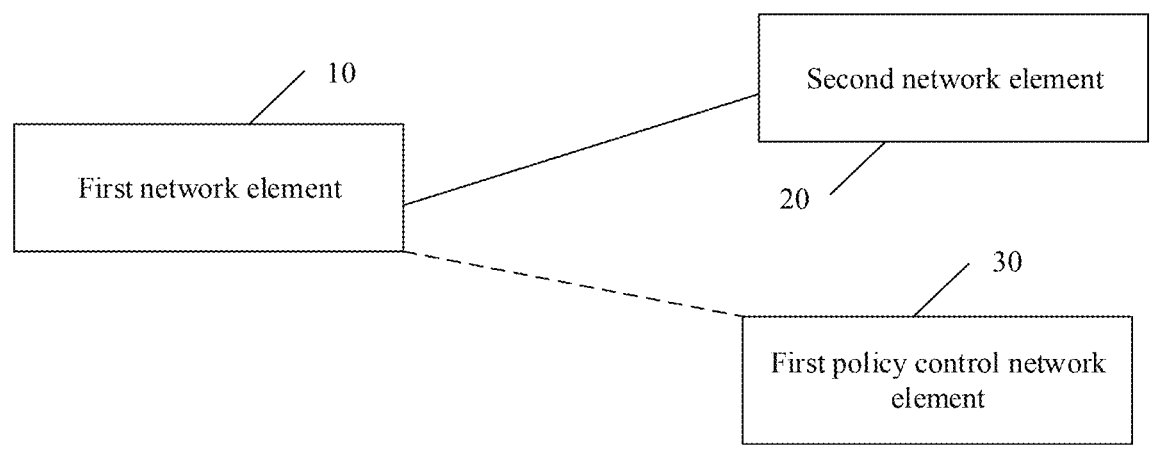
FIG. 2 is a schematic structural diagram of a communications system according to an embodiment of this application.

FIG. 2 is a schematic diagram of a communications system according to an embodiment of this application. The communications system includes a first network element 10 and a second network element 20.

The first network element 10 is configured to: determine a remaining resource of a terminal in a first network, and send, to a first policy control network element, information used to indicate the remaining resource.

In some embodiments, the communications system may further include the first policy control network element 30. The first policy control network element 30 is a policy control network element that provides a service for the terminal in the first network. The first network is at least one of a first data network (DN) and a first network slice. The remaining resource is a subscribed resource currently available to the terminal in the first network.

For example, the first data network DN may be identified by using a first data network name (DNN). The first network slice may be identified by using single network slice selection assistance information (S-NSSAI).

In some embodiments, the first policy control network element 30 may be a policy control network element that provides a service for a session of the terminal in the first network.

In some embodiments, the session in this embodiment of this application may be, for example, a PDU session (session). This is uniformly described herein and is not specifically limited in this embodiment of this application.

The PDU session is a connection that is between a terminal and a data network (data network, DN) and that is defined in a 5th generation (5G) mobile communications system, and is used to provide a PDU connection service. The PDU connection service supported by a 5G core network (CN) is a service that provides PDU exchange between a terminal and a DN determined by a DNN. A network slice may be a complete end-to-end network including a terminal, an access network, a transport network, a core network, and an application server.

Specifically, the second network element 10 is configured to: before the first network element 10 determines the remaining resource of the terminal in the first network, obtain a resource that has been allocated to the terminal in the first network; and send, to the first network element 10, an identifier of the terminal, an identifier of the first network, and information used to determine the remaining resource of the terminal in the first network, where the identifier of the first network includes at least one of an identifier of the first DN and an identifier of the first network slice.

In this embodiment of this application, the first policy control network element 30 and the first network element 10 may directly communicate with each other, or may communicate with each other through forwarding performed by another device. This is not specifically limited in this embodiment of this application.

Based on the communications system provided in this embodiment of this application, the second network element may send, to the first network element, the identifier of the terminal, the identifier of the first network, and the information used to determine the remaining resource of the terminal in the first network. Further, the first network element may determine the remaining resource of the terminal in the first network based on the identifier of the terminal and the identifier of the first network. The first network element sends the remaining resource of the terminal in the first network to a second policy control network element, and the second policy control network element may be a policy control network element different from a policy control network element that has allocated a subscribed resource or a policy control network element that subscribes to a remaining resource change notification from the first network element. In other words, it can be ensured that the remaining resource of the terminal in the first network is obtained for different policy control network elements corresponding to a plurality of sessions that are of a same terminal and that correspond to at least one of a same network slice and a same data network. Therefore, this can avoid a problem that a conflict occurs between a policy formulated by different policy control network elements for a plurality of PDU sessions that are of a same terminal and that correspond to at least one of a same network slice and a same data network and subscription information obtained from a unified database network element.

In some embodiments, the first network element 10 is specifically configured to: receive the identifier of the terminal, the identifier of the first network, and the information used to determine the remaining resource of the terminal in the first network that are from the second network element 20; and determine the remaining resource of the terminal in the first network based on the information used to determine the remaining resource of the terminal in the first network. Alternatively, the first network element 10 is specifically configured to: receive the identifier of the first network and the information used to determine the remaining resource of the terminal in the first network that are from the second network element 20; and determine the remaining resource of the terminal in the first network based on the information used to determine the remaining resource of the terminal in the first network.

In some embodiments, if the information used to determine the remaining resource of the terminal in the first network is information used to indicate the remaining resource, the first network element 10 is specifically configured to determine the remaining resource of the terminal in the first network based on the information used to indicate the remaining resource.

In a possible implementation, that the first network element 10 receives the identifier of the terminal, the information used to indicate the remaining resource, and the identifier of the first network that are from the second network element 20 specifically includes: The first network element 10 receives a data management creation service operation request or a data management update service operation request from the second network element 20, where the data management creation service operation request or the data management update service operation request carries the identifier of the terminal, the information used to indicate the remaining resource, and the identifier of the first network.

In another possible implementation, that the first network element 10 is specifically configured to receive the identifier of the first network and the information used to determine the remaining resource of the terminal in the first network that are from the second network element 20 specifically includes: The first network element 10 receives a data management creation service operation request or a data management update service operation request from the second network element 20, where the data management creation service operation request or the data management update service operation request carries the identifier of the first network and the information used to indicate the remaining resource.

In some embodiments, if the information used to determine the remaining resource of the terminal in the first network is information used to indicate a resource that has been allocated by the second policy control network element, the first network element 10 specifically determines the remaining resource based on a remaining subscribed resource of the terminal in the first network and the resource that has been allocated.

In a possible implementation, that the first network element 10 receives the identifier of the terminal, the identifier of the first network, and the information used to indicate the resource that has been allocated by the second policy control network element, where the identifier of the terminal, the identifier of the first network, and the information are from the second network element 20, specifically includes: The first network element 10 receives an event exposure notification service from the second network element 20, where the event exposure notification service carries the identifier of the terminal, the identifier of the first network, and the information used to indicate the resource that has been allocated by the second policy control network element.

In another possible implementation, that the first network element 10 receives the identifier of the first network and the information used to indicate the resource that has been allocated by the second policy control network element, where the identifier of the first network and the information are from the second network element 20, specifically includes: The first network element 10 receives an event exposure notification service from the second network element 20, where the event exposure notification service carries the identifier of the first network and the information used to indicate the resource that has been allocated by the second policy control network element.

In some embodiments, when the first network element 10 determines that the first policy control network element exists in policy control network elements corresponding to the first network, the first network element sends, to the first policy control network element, the information used to indicate the remaining resource, where the first policy control network element is a policy control network element that is other than the second policy control network element and that is in the policy control network elements corresponding to the first network, or the first policy control network element is a policy control network element that subscribes to a remaining resource change notification from the first network element in the first network 10.

In some embodiments, the communications system shown in FIG. 2 may be applied to a current 5G network architecture and another future network architecture. This is not specifically limited in this embodiment of this application.

The following uses an example in which the communications system shown in FIG. 2 is applicable to a 5G network architecture. Because the 5G network architecture further includes a non-roaming scenario and a roaming scenario, the non-roaming scenario and the roaming scenario are separately described in the following embodiments.

Figure 3A:
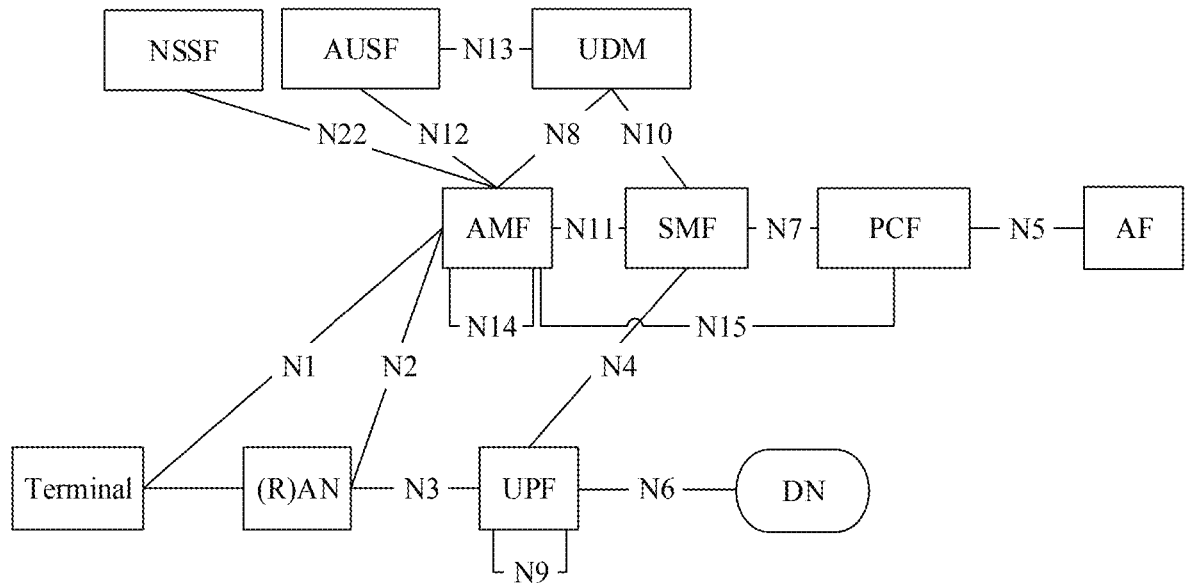
FIG. 3*a* is a schematic application diagram 1 of a communications system in a non-roaming 5G network architecture according to an embodiment of this application.
Figure 3B:
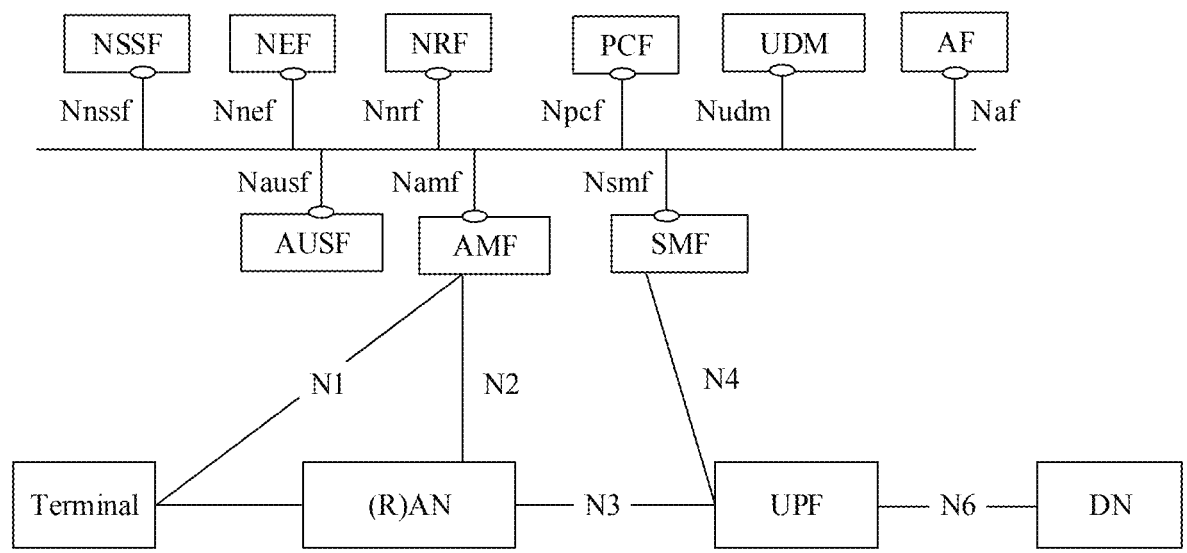
FIG. 3*b* is a schematic application diagram 2 of a communications system in a non-roaming 5G network architecture according to an embodiment of this application.

In the 5G network architecture, in the non-roaming scenario, the 5G network architecture may be applicable to an interface-based architecture in FIG. 3*a*, or may be applicable to an architecture based on a service-based interface shown in FIG. 3*b*. In the roaming scenario, the 5G network architecture is not only applicable to interface-based architectures shown in FIG. 3*c* and FIG. 3*e*, but also applicable to architectures based on a service-based interface shown in FIG. 3*d* and FIG. 3*f*.

For example, the communications system shown in FIG. 2 is applied to an interface-based architecture in a current non-roaming 5G network architecture, as shown in FIG. 3*a*, a network element or an entity corresponding to the first network element 10 may be any one of a unified data repository (UDR), a unified data management (UDM), or a binding support function (BSF) in the non-roaming 5G network architecture. The second network element 20 may be a session management function (SMF) network element or a policy control function (PCF) network element in the non-roaming 5G network architecture. A network element or an entity corresponding to the first policy control network element 30 may be a PCF network element in the non-roaming 5G network architecture.

In addition, as shown in FIG. 3*a*, the non-roaming 5G network architecture may further include an access device (for example, an access network (AN) or a radio access network (RAN)), a user plane function (user plane function, UPF) network element, a data network (DN), an access and mobility management function (AMF) network element, an authentication server function (AUSF) network element, a network slice selection function (NSSF) network element, a network exposure function (NEF) network element, a network repository function (NRF) network element, an application function (AF), and the like. This is not specifically limited in this embodiment of this application.

The terminal communicates with the AMF network element through a next generation network (N1) interface (N1 for short). The access device communicates with the AMF network element through an N2 interface (N2 for short). The access device communicates with the UPF network element through an N3 interface (N3 for short). The UPF network element communicates with the DN through an N6 interface (N6 for short). The UPF network element communicates with the SMF network element through an N4 interface (N4 for short). The AMF network element communicates with the SMF network element through an N11 interface (N11 for short). The AMF network element communicates with the UDM network element through an N8 interface (N8 for short). The SMF network element communicates with the PCF network element through an N7 interface (N7 for short). The SMF network element communicates with the UDM network element through an N10 interface (N10 for short). The AMF network element communicates with the AUSF network element through an N12 interface (N12 for short). The AMF network element communicates with the NSSF network element through an N22 interface (N22 for short). The AUSF network element communicates with the UDM network element through an N13 interface (N13 for short). The UDM network element communicates with the UDR network element. The PCF network element communicates with the UDR network element. The BSF network element communicates with the PCF network element and the SMF network element.

FIG. 3*b* shows the architecture based on the service-based interface in the non-roaming 5G network architecture. A difference of the architecture from the architecture in FIG. 3*a* lies in that control plane network elements in a 5GC in FIG. 3*b* may also interact with each other through a service-based interface. For example, the AMF network element, the AUSF network element, the SMF network element, the UDM network element, the UDR network element, the NRF network element, the NEF network element, the NSSF network element, or the PCF network element interact with each other through a service-based interface. For example, an external service-based interface provided by the AMF network element may be Namf. An external service-based interface provided by the SMF network element may be Nsmf. An external service-based interface provided by the UDM network element may be Nudm. An external service-based interface provided by the UDR network element may be Nudr. An external service-based interface provided by the PCF network element may be Npcf. An external service-based interface provided by the BSF network element may be Nbsf. An external service-based interface provided by the NEF network element may be Nnef. An external service-based interface provided by the NRF network element may be Nnrf. An external service-based interface provided by the NSSF network element may be Nnssf. It should be understood that, for related descriptions of names of various service-based interfaces in FIG. 3*b*, refer to a 5G system architecture (5G system architecture) diagram in the 23501 standard. Details are not described herein.

It should be noted that FIG. 3*a* and FIG. 3*b* merely show, for example, one SMF network element and one PCF network element. Certainly, the non-roaming 5G network architecture may include a plurality of SMF network elements and PCF network elements, for example, include an SMF network element 1 and an SMF network element 2. The SMF network element 1 communicates with a PCF network element 1, and the SMF network element 2 communicates with a PCF network element 2. This is not specifically limited in this embodiment of this application. For a manner in which network elements are connected to each other, refer to the non-roaming 5G network architecture shown in FIG. 3*a* or FIG. 3*b*. Details are not described one by one herein again.

In the architecture shown in FIG. 3*a* or FIG. 3*b*, the network elements belong to a home public land mobile network (home public land mobile network, HPLMN).

Figure 3C:
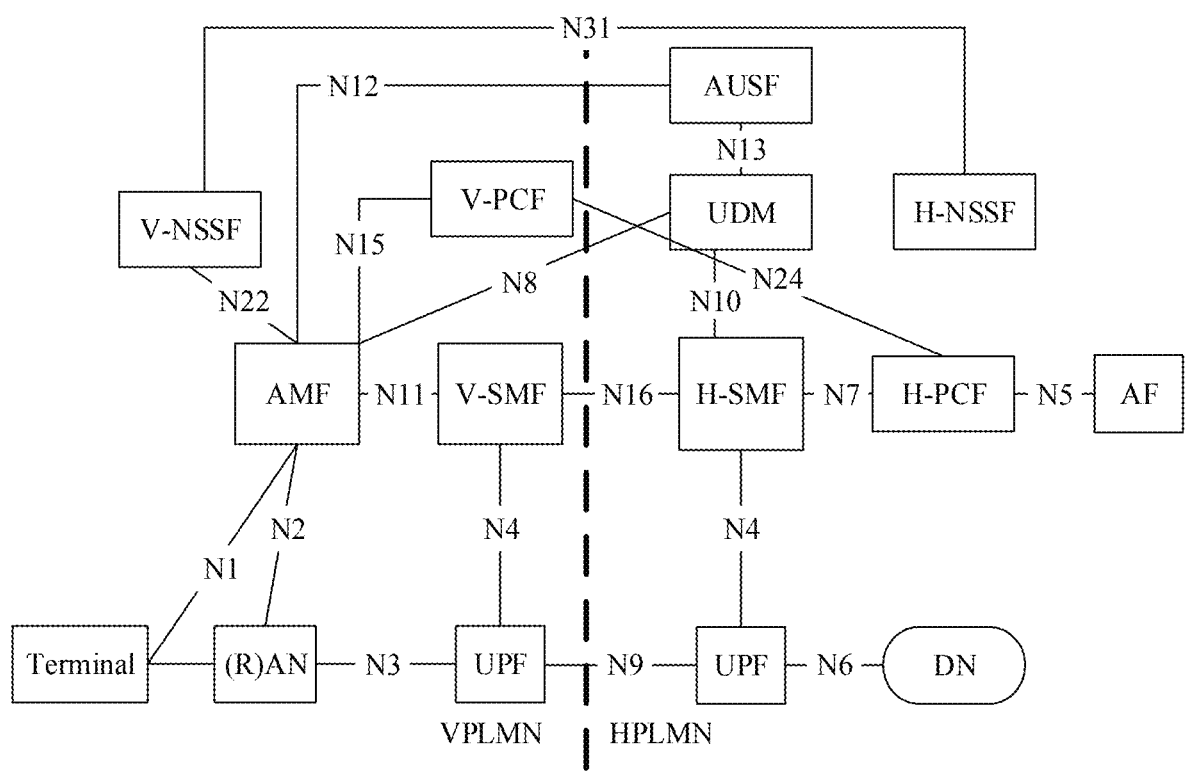
FIG. 3*c* is a schematic application diagram 1 of a communications system in a home route in a roaming 5G network architecture according to an embodiment of this application.

Alternatively, for example, the communications system shown in FIG. 2 is applied to a home routed (home routed) scenario in a current roaming 5G network architecture. As shown in FIG. 3*c*, a network element or an entity corresponding to the second network element 20 may be a home SMF (H-SMF) network element or a home PCF (H-PCF) network element in the home routed scenario. A network element or an entity corresponding to the first network element 10 may be a BSF in the home routed scenario. Alternatively, a network element or an entity corresponding to the first network element 10 may be a UDM network element in the home routed scenario. Alternatively, a network element or an entity corresponding to the first network element 10 may be a UDR network element in the home routed scenario.

In addition, as shown in FIG. 3*c*, in the home routed scenario, an access device (for example, an AN or a RAN), an AMF network element, a visited SMF (V-SMF) network element, a home UPF (H-UPF) network element, a visited UPF (V-UPF) network element, a visited PCF (V-PCF) network element, a visited NSSF (V-NSSF) network element, an AUSF network element, a DN, an AF network element, and a home NSSF (H-NSSF) may be further included.

The terminal, the access device, the AMF network element, the V-PCF network element, the V-SMF network element, the V-UPF network element, the V-NSSF network element, and the V-PCF network element belong to a visited public land mobile network (VPLMN). The UDM network element, the UDR network element, the H-PCF network element, the H-NSSF network element, the AF network element, the H-SMF network element, the H-UPF network element, and the BSF network element belong to the HPLMN. The H-PCF network element performs session management-related policy control.

As shown in FIG. 3c, the terminal communicates with the AMF network element through N1. The access device communicates with the AMF network element through an N2 interface (N2 for short). The access device communicates with the V-UPF network element through an N3 interface (N3 for short). The V-UPF network element communicates with the H-UPF network element through an N9 interface (N9 for short). The AMF network element communicates with the V-SMF network element through an N11 interface (N11 for short). The AMF network element communicates with the UDM network element through an N8 interface (N8 for short). The AMF network element communicates with the V-NSSF network element through an N22 interface (N22 for short). The V-NSSF network element communicates with the H-NSSF network element through an N31 interface (N31 for short). The AMF network element communicates with the AUSF network element through an N12 interface (N12 for short). The AMF network element communicates with the V-PCF network element through an N15 interface (N15 for short). The V-PCF network element communicates with the H-PCF network element through an N24 interface (N24 for short). The V-SMF network element communicates with the H-SMF network element through an N16 interface (N16 for short). The H-SMF network element communicates with the H-PCF network element through an N7 interface (N7 for short). The H-SMF network element communicates with the H-UPF network element through an N4 interface (N4 for short). The V-SMF network element communicates with the V-UPF network element through an N4 interface (N4 for short). The H-SMF network element communicates with the UDM network element through an N10 interface (N10 for short). The H-UPF network element communicates with the DN through an N6 interface (N6 for short). The H-PCF network element communicates with the UDR network element, and the BSF network element communicates with the H-PCF network element and the H-SMF network element. The H-PCF network element communicates with the AF network element through an N5 interface (N5 for short).

Figure 3D:
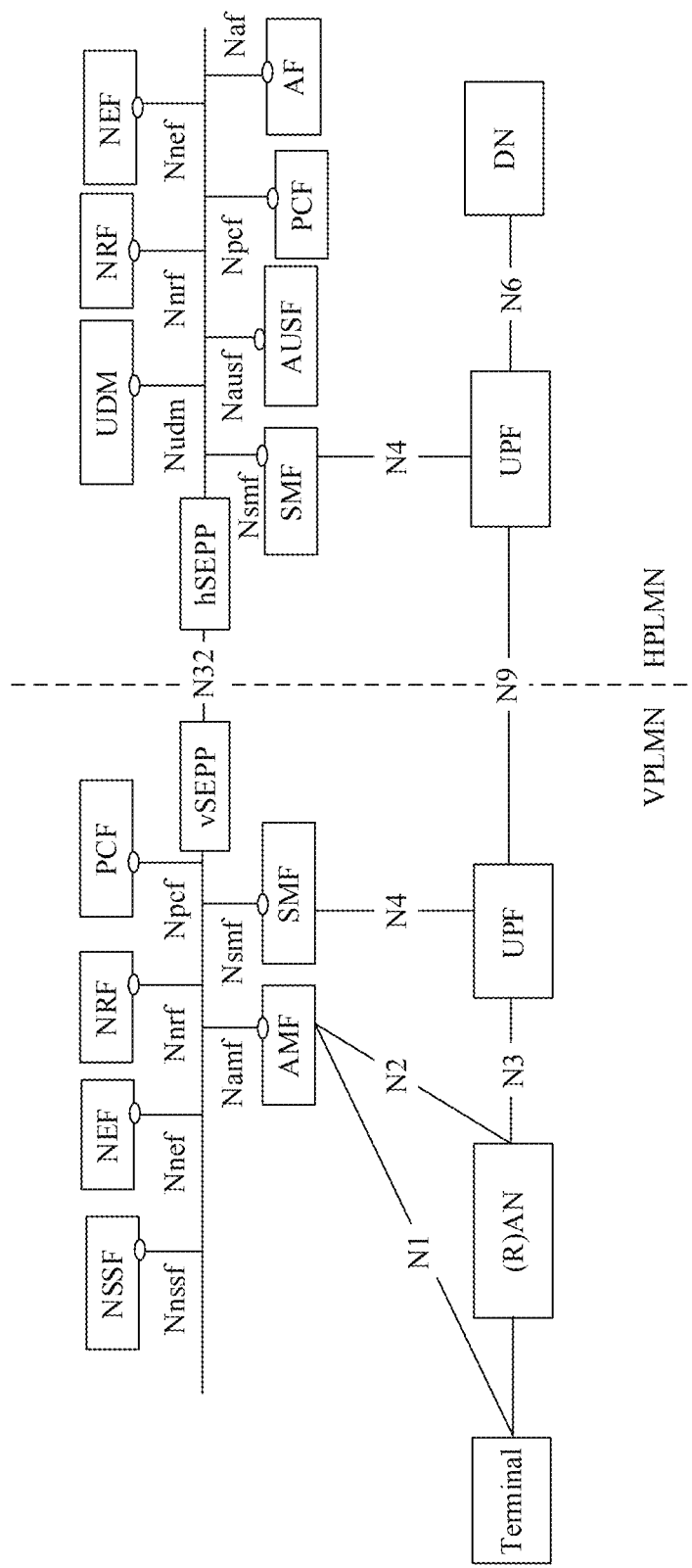
FIG. 3*d* is a schematic application diagram 2 of a communications system in a home route in a roaming 5G network architecture according to an embodiment of this application.

FIG. 3d shows the architecture based on the service-based interface in the home routed scenario in the roaming 5G network architecture. A difference of the architecture from the architecture in FIG. 3c lies in that the control plane network element in a 5GC in FIG. 3d may also interact with each other through a service-based interface. For example, an external service-based interface provided by the H-SMF network element may be Nsmf. An external service-based interface provided by the V-SMF network element may be Nsmf. An external service-based interface provided by the UDM network element may be Nudm. An external service-based interface provided by the UDR network element may be Nudr. An external service-based interface provided by the V-PCF network element may be Npcf. An external service-based interface provided by the H-PCF network element may be Npcf. An external service-based interface provided by the BSF network element may be Nbsf. For names of service-based interfaces of other control plane network elements, refer to the descriptions in FIG. 3b. Details are not described herein again.

It should be understood that, in the network architecture shown in FIG. 3d, the HPLMN further includes an H-security edge protection proxy (SEPP), and the HPLMN further includes a V-SEPP. The H-SEPP and the V-SEPP communicate with each other through an N32 interface (N32 for short).

Figure 3E:
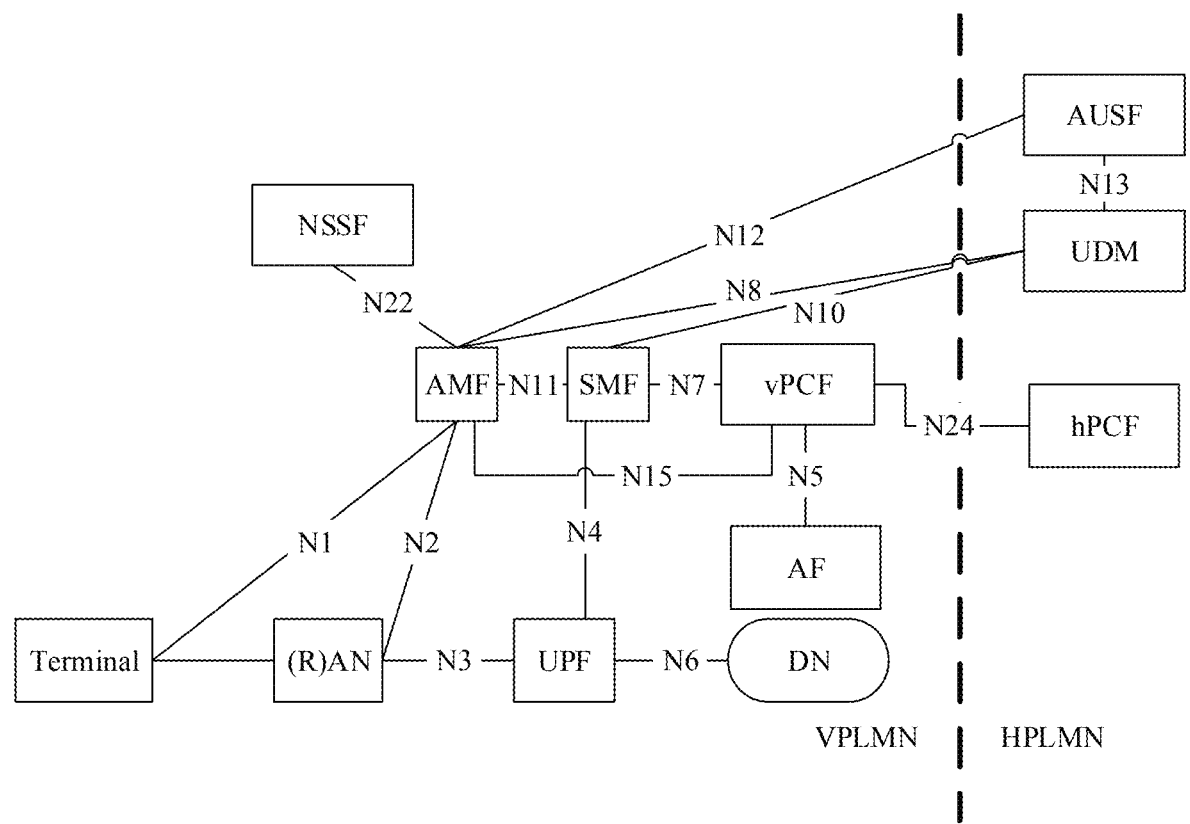
FIG. 3*e* is a schematic application diagram 1 a communications system in a local breakout in a roaming 5G network architecture according to an embodiment of this application.

Alternatively, for example, the communications system shown in FIG. 2 is applied to the local breakout (Local breakout) roaming scenario in the current roaming 5G network architecture. As shown in FIG. 3e, a network element or an entity corresponding to the second network element 20 may be the V-SMF network element or the V-PCF network element in the local breakout roaming scenario. A network element or an entity corresponding to the first network element 10 may be a BSF network element in the local breakout roaming scenario. Alternatively, a network element or an entity corresponding to the first network element 10 may be a UDM network element in the local breakout roaming scenario. Alternatively, a network element or an entity corresponding to the first network element 10 may be a UDR network element in the local breakout roaming scenario.

In addition, in the local breakout roaming scenario shown in FIG. 3e, an access device (for example, an AN or a RAN), an AMF network element, an SMF network element, a UPF network element, a DN, an H-PCF network element, an AUSF network element, an AF network element, and an NSSF network element may be further included.

The terminal, the access device, the AMF network element, the V-PCF network element, the V-SMF network element, the UPF network element, the NSSF network element, the BSF network element, the UDR network element, and the DN belong to the VPLMN. The AUSF network element, the UDM network element, and the H-PCF network element belong to the HPLMN. The V-PCF network element performs session management-related policy control.

For names of communications interfaces between network elements in FIG. 3e, refer to the descriptions in FIG. 3c. Details are not described herein again.

Figure 3F:
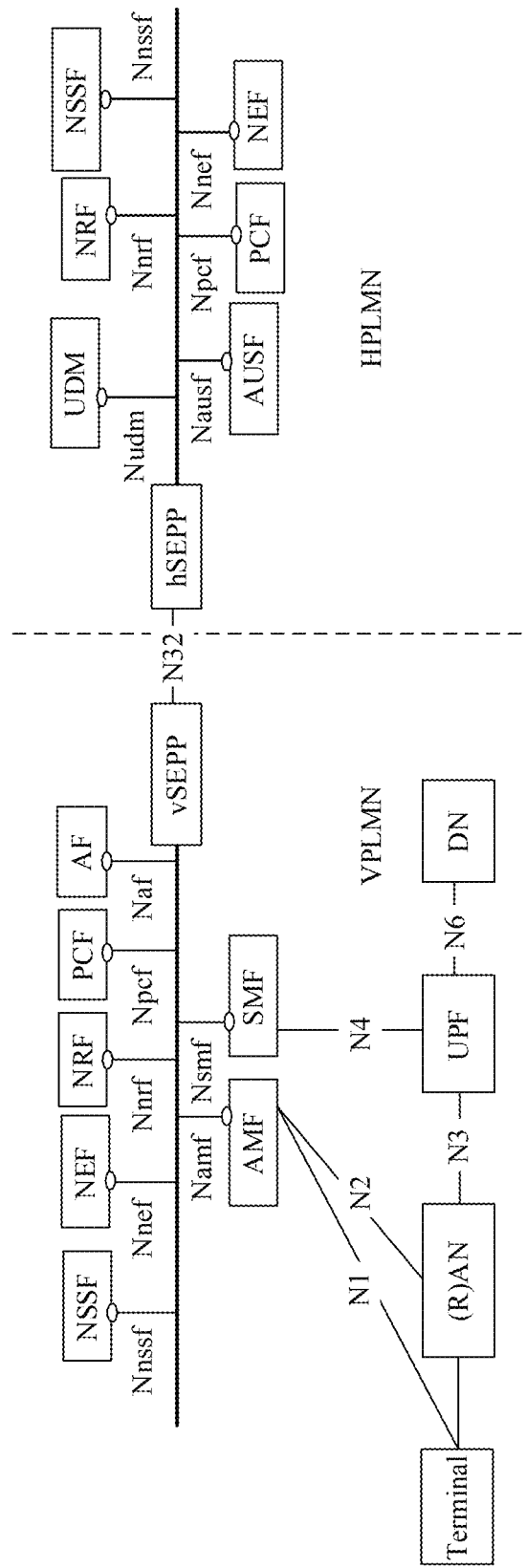
FIG. 3*f* is a schematic application diagram 2 of a communications system in a local breakout in a roaming 5G network architecture according to an embodiment of this application.

FIG. 3f shows the architecture based on the service-based interface in the local breakout roaming scenario in the roaming 5G network architecture. A difference of the architecture from the architecture in FIG. 3e lies in that the control plane network element in a 5GC in FIG. 3f may also interact with each other through a service-based interface. For specific names of service-based interfaces of network elements, refer to the descriptions in FIG. 3d. Details are not described herein again.

It should be noted that FIG. 3c to FIG. 3f merely show, for example, one V-SMF network element, one H-SMF network element, one H-UPF network element, and one V-UPF network element. Certainly, the home routed scenario or the local breakout roaming scenario may include a plurality of V-SMF network elements, a plurality of H-SMF network elements, a plurality of V-UPF network elements, and a plurality of H-UPF network elements, for example, include a V-SMF network element 1 and an H-SMF network element 1 communicating with the V-SMF network element 1, a V-SMF network element 2 and an H-SMF network element 2 communicating with the V-SMF network element 2, and the like. The V-SMF network element 1 communicates with the V-UPF network element 1, and the V-SMF network element 2 communicates with the V-UPF network element 2. The H-SMF network element 1 communicates with the H-UPF network element 1, and the H-SMF network element 2 communicates with the H-UPF network element 2. This is not specifically limited in the embodiments of this application.

It should be noted that names of the network elements or names of interfaces between the network elements in FIG. 3a to FIG. 3f are merely examples. During specific implementation, names of network elements or names of interfaces may be other names. This is not specifically limited in the embodiments of this application.

The terminal (terminal) in the embodiments of this application may include various handheld devices, vehicle-mounted devices, wearable devices, and computing devices that have a wireless communication function, or another processing device connected to a wireless modem. The terminal may further include a subscriber unit (subscriber unit), a cellular phone (cellular phone), a smartphone (smart phone), a wireless data card, a personal digital assistant (personal digital assistant, PDA) computer, a tablet computer, a wireless modem (modem), a handheld (handheld) device, a laptop computer (laptop computer), a cordless phone (cordless phone) or a wireless local loop (WLL) station, a machine type communication (MTC) terminal, user equipment (UE), a mobile station (mobile station, MS), a terminal device (terminal device), relay user equipment, or the like. The relay user equipment may be, for example, a 5G residential gateway (RG). For ease of description, in this application, the devices mentioned above are collectively referred to as the terminal.

In some embodiments, the access device in the embodiments of this application is a device that accesses a core network. For example, the access device may be a base station, a broadband network gateway (BNG), an aggregation switch, or a non-3rd generation partnership project (3GPP) access device. There may be base stations in various forms, for example, a macro base station, a micro base station (also referred to as a small cell), a relay station, and an access point.

It should be understood that when the terminal may access the systems shown in FIG. 3a to FIG. 3f through the access device, a network element (for example, an NSSF network element) in a 5G core network (5GC) allocates one or more network slices to the terminal. Each network slice may include one or more of a UPF network element, an SMF network element, an NRF network element, and a PCF network element.

Functions of the network elements described in FIG. 3a to FIG. 3f are as follows:

UPF network element: A main function of the UPF network element includes a function related to a user plane, such as packet routing and transmission, packet detection, service usage reporting, QoS processing, lawful interception, uplink packet detection, or downlink data packet storage.

AMF network element: A main function of the AMF network element includes a function related to access and mobility, such as connection management, mobility management, registration management, access authentication and authorization, reachability management, or security context management.

SMF network element: A main function of the SMF network element includes a function related to a session, such as session management (for example, session establishment, modification, and release, including tunnel maintenance between the UPF and an AN), selection and control of the UPF network element, service and session continuity (SSC) mode selection, or roaming.

PCF network element: A main function of the PCF network element includes a function related to a policy, such as formulating a unified policy, providing policy control, and obtaining policy decision-related subscription information from a UDR.

NSSF network element: Main functions of the NSSF network element include: selecting a group of network slice instances for the terminal, determining allowed NSSAI, determining an AMF network element set that can serve the terminal, and the like.

NRF network element: Main functions of the NRF network element include a service discovery function and maintaining NF text of an available network function (NF) instance and a service supported by the NF instance.

The AF network element interacts with a 3GPP core network to provide a service or a service, including interacting with the NEF, interacting with a policy architecture, or the like.

Main functions of the NEF network element include securely exposing a service and a capability provided by a 3GPP network function, including internally exposing the service and the capability, exposing the service and the capability to a third party, or the like, and converting or translating information exchanged with the AF and information exchanged with an internal network function, such as an AF service identifier and internal 5G core network information such as a DNN, S-NSSAI, and the like.

The UDM supports processing of a letter of credence for authentication, user identity processing, access authorization, registration and mobility management, subscription management, short message management, or the like in a 3GPP authentication key agreement mechanism.

The AUSF network element interacts with the UDM to obtain user information, and performs an authentication-related function, for example, generating an intermediate key.

The UDR is configured to store subscription data (Subscribed Data), policy data (Policy Data), application data (Application Data), and the like.

Figure 4:
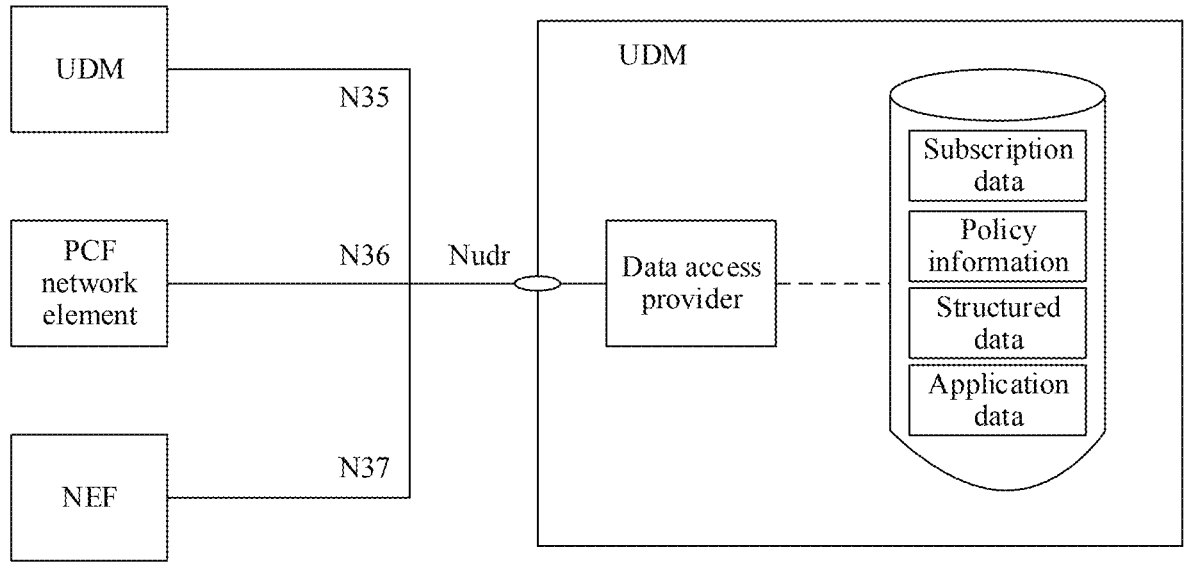
FIG. 4 is a schematic diagram of a data storage architecture according to an embodiment of this application.

In the embodiments of this application, the UDM, the PCF network element, and the NEF in FIG. 3a to FIG. 3f may store data in the UDR by using a data storage architecture (Data storage architecture). Specifically, as shown in FIG. 4, the UDM stores data in the UDR through an N35 interface, the PCF network element stores data in the UDR through an N36 interface, and the NEF stores data in the UDR through an N37 interface. For example, the UDR may store subscription data (Subscription Data), application data (Application Data), policy data (Policy Data), and structured data for exposure (Structured Data for exposure).

Figure 5:
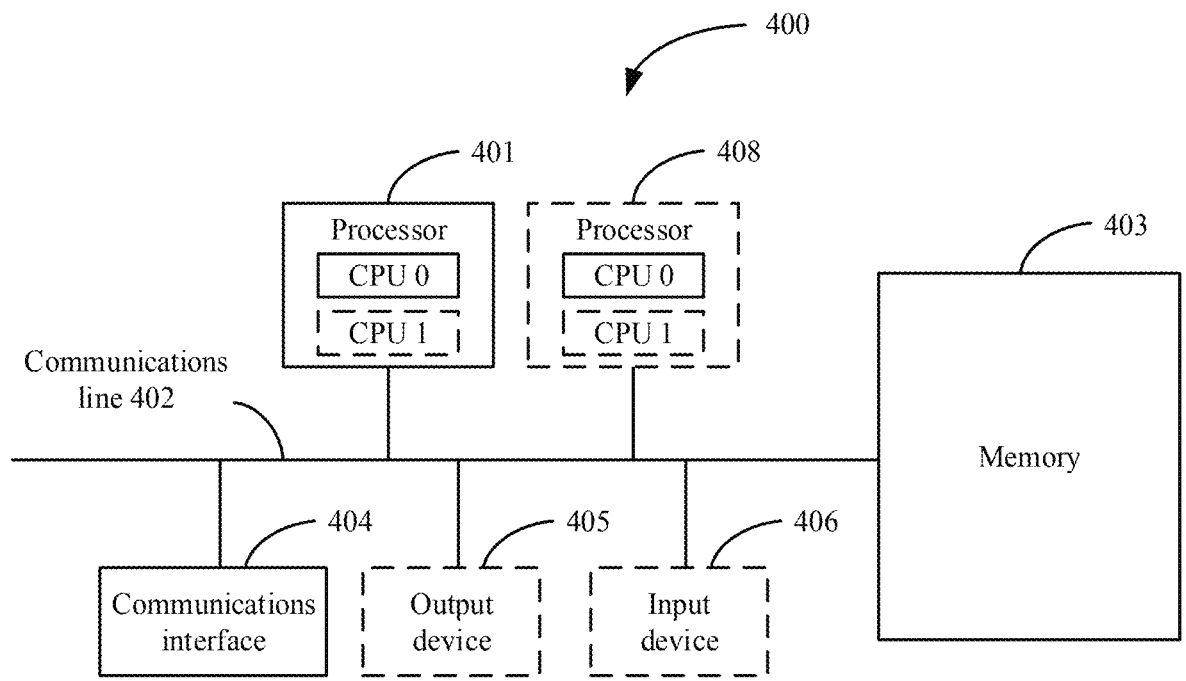
FIG. 5 is a schematic structural diagram of a communications device according to an embodiment of this application.

FIG. 5 is a schematic diagram of a hardware structure of a communications device according to an embodiment of this application. The communications device 400 includes a processor 401, a communications line 402, a memory 403, and at least one communications interface (where descriptions are provided in FIG. 5 merely by using an example in which the communications device 400 includes the communications interface 404).

The processor 401 may be a general-purpose central processing unit (CPU), a microprocessor, an application-specific integrated circuit (ASIC), or one or more integrated circuits configured to control program execution of the solutions of this application.

The communications line 402 may include a path for transmitting information between the foregoing components.

The communications interface 404 is any apparatus such as a transceiver, and is configured to communicate with another device or a communications network such as the Ethernet, a radio access network (RAN), or a wireless local area network (WLAN).

The memory 403 may be a read-only memory (ROM), another type of static storage device that can store static information and static instructions, a random access memory (RAM), or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of instructions or a data structure and that can be accessed by a computer. However, this is not limited thereto. The memory may exist independently, and is connected to the processor through the communications line 402. Alternatively, the memory may be integrated with the processor.

The memory 403 is configured to store computer-executable instructions for executing the solutions of this application, and the processor 401 controls the execution. The processor 401 is configured to execute the computer-executable instructions stored in the memory 403, to implement a policy control method provided in the following embodiments of this application.

The computer-executable instructions in this embodiment of this application may also be referred to as application program code. This is not specifically limited in this embodiment of this application.

During specific implementation, in an embodiment, the processor 401 may include one or more CPUs, for example, a CPU 0 and a CPU 1 in FIG. 5.

During specific implementation, in an embodiment, the communications device 400 may include a plurality of processors, for example, the processor 401 and a processor 408 in FIG. 5. Each of the processors may be a single-core processor (single-CPU) or a multi-core processor (multi-CPU). The processor herein may refer to one or more devices, circuits, and/or processing cores configured to process data (for example, computer program instructions).

During specific implementation, in an embodiment, the communications device 400 may further include an output device 405 and an input device 406. The output device 405 communicates with the processor 401, and may display information in a plurality of manners. For example, the output device 405 may be a liquid crystal display (LCD), a light emitting diode (LED) display device, a cathode ray tube (CRT) display device, or a projector (projector), or the like. The input device 406 communicates with the processor 401, and may receive an input of a user in a plurality of manners. For example, the input device 406 may be a mouse, a keyboard, a touchscreen device, or a sensing device.

The communications device 400 may be a general-purpose device or a dedicated device. During specific implementation, the communications device 400 may be a desktop computer, a portable computer, a network server, a personal digital assistant (PDA), a mobile phone, a tablet computer, a wireless terminal device, an embedded device, or a device having a structure similar to that in FIG. 5. A type of the communications device 400 is not limited in this embodiment of this application.

The following specifically describes the resource information sending method provided in the embodiments of this application with reference to FIG. 2 to FIG. 3f.

It should be noted that in the following embodiments of this application, names of messages between network elements, names of parameters in messages, or the like are merely examples, and may be other names during specific implementation. This is not specifically limited in the embodiments of this application.

It should be understood that, in the embodiments of this application, the resource information sending method may be performed by a network element corresponding to the resource information sending method, or may be performed by a chip in a network element corresponding to the resource information sending method. In the following embodiments, for example, a resource information sending method is performed by a first network element.

Figure 6:
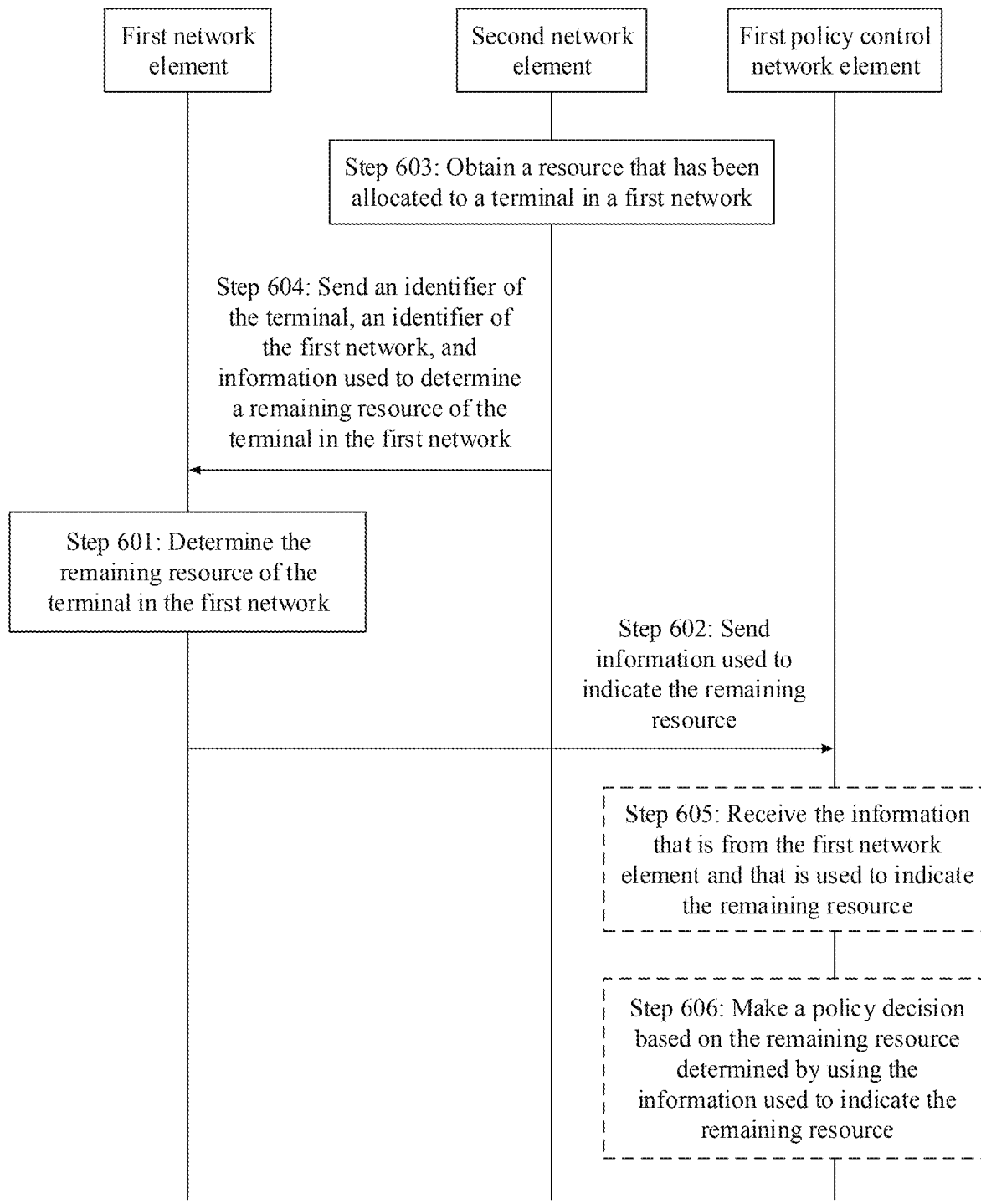
FIG. 6 is a schematic flowchart 1 of a resource information sending method according to an embodiment of this application.

An example in which the resource information sending method provided in the embodiments of this application is applied to the communications system shown in FIG. 2 is used. FIG. 6 shows a resource information sending method according to an embodiment of this application. The method includes the following steps.

Step 601: A first network element determines a remaining resource of a terminal in a first network. The first network is at least one of a first DN and a first network slice. The remaining resource is a subscribed resource currently available to the terminal in the first network.

For example, the first network may be the first DN and the first network slice. Alternatively, the first network may be the first DN. Alternatively, the first network may be the first network slice.

It should be understood that a UDR stores the subscribed resource of the terminal in the first network. The subscribed resource may be a maximum guaranteed bandwidth that is allowed to be authorized by a PCF network element to the terminal in the first network.

It should be understood that, if the first network is the first DN and the first network slice, the remaining resource is a subscribed resource currently available to the terminal in the first DN and the first network slice.

If the first network is the first DN, the remaining resource is a subscribed resource currently available to the terminal in the first DN.

If the first network is the first network slice, the remaining resource is a subscribed resource currently available to the terminal in the first network slice.

For example, a resource in this embodiment of this application may be a GBR resource, usage information, or attribute information of the first network slice. For example, the subscribed resource is the GBR resource, and may be a maximum aggregate bit rate that is allowed to be authorized by the PCF network element to all GBR quality of service flows of the terminal in the first network.

For example, the usage information in this embodiment of this application may be accumulated usage of a network resource. For example, the network resource may be time (time) usage, traffic, a bandwidth, or the like allocated to at least one of the first DN and the first network slice. Descriptions are uniformly provided herein, and details are not described subsequently again. The attribute information of the first network slice may be specifically a quantity of terminals that can be supported or a quantity of PDU sessions that can be supported.

The quantity of PDU sessions may be specifically a quantity of connections (Number of connections). The attribute describes a maximum quantity of concurrent sessions supported by the first network slice (the maximum number of concurrent sessions supported by the network slice), for example, 100,000 sessions. The quantity of terminals may be a quantity of terminals (Number of terminals/UEs). This attribute describes a maximum quantity of terminals supported by the network slice (the maximum number of terminals supported by the network slice), for example, 10,000,000 (terminals/sensors).

Step 602: The first network element sends, to a first policy control network element, information used to indicate the remaining resource of the terminal in the first network.

In some embodiments, in step 602, the first network element may further send an identifier of the terminal and an identifier of the first network to the first policy control network element.

For example, an identifier of the first DN is used to identify the first DN, and an identifier of the first network slice is used to identify the first network slice. For example, the identifier of the first DN may be a data network name (DNN). The identifier of the first network slice may be single network slice selection assistance information (S-NSSAI), network slice selection support information (NSSAI), or a network slice instance (NSI) ID. Descriptions are uniformly provided herein. This is not specifically limited in this embodiment of this application.

For example, in this embodiment of this application, the identifier of the terminal may be, for example, a subscription permanent identifier (SUPI). Descriptions are uniformly provided herein, and details are not described subsequently again.

For example, the identifier of the first network is at least one of the identifier of the first DN and the identifier of the first network slice.

In some embodiments, the first policy control network element is a policy control network element that provides a service for the terminal in the first network.

For example, the first policy control network element is a policy control network element that provides a session service for the terminal in the first network.

The session in this embodiment of this application may be a PDU session.

It should be noted that, if the first network element may be a UDR, a BSF, or a UDM network element, when the first network element is the UDM network element, the first network element may send, to the first policy control network element by using the UDR, the information used to indicate the remaining resource.

In this embodiment of this application, the first network element and the first policy control network element may directly communicate with each other, or may communicate with each other through forwarding performed by another device. This is not specifically limited in this embodiment of this application.

For example, if the first network element is the BSF or the UDR, the first network element may directly send, to the first policy control network element, the information used to indicate the remaining resource. If the first network element is the UDM, the first network element may send, to the first policy control network element by using the UDR, the information used to indicate the remaining resource.

In some embodiments, as shown in FIG. 6, before step 601, the method provided in this embodiment of this application further includes the following steps.

Step 603: A second network element obtains a resource that has been allocated to the terminal in the first network.

For example, if the second network element is a second policy control network element, the second policy control network element may obtain, based on a resource allocated/released each time, namely, a PCC rule that carries a resource parameter and that is generated/modified/deleted, the resource that has been allocated to the terminal in the first network.

Step 604: The second network element sends, to the first network element, the identifier of the terminal, the identifier of the first network, and the information used to determine the remaining resource of the terminal in the first network, so that the first network element receives the identifier of the terminal, the identifier of the first network, and the information used to determine the remaining resource of the terminal in the first network that are from the second network element.

In this case, step 601 may be implemented in the following manner: The first network element determines the remaining resource of the terminal in the first network based on the identifier of the terminal, the identifier of the first network, and the information used to determine the remaining resource of the terminal in the first network.

As an alternative to step 604, step 604 may be alternatively implemented in the following manner: The second network element sends, to the first network element, the identifier of the first network and the information used to determine the remaining resource of the terminal in the first network, so that the first network element receives the identifier of the first network and the information used to determine the remaining resource of the terminal in the first network that are from the second network element. In this case, step 601 may be implemented in the following manner: The first network element determines the remaining resource of the terminal in the first network based on the identifier of the first network and the information used to determine the remaining resource of the terminal in the first network.

It should be understood that if the second network element sends the identifier of the terminal, the identifier of the first DN, and the information used to determine the remaining resource of the terminal in the first network, the first network element may determine the remaining resource of the terminal in the first DN. If the second network element sends the identifier of the terminal, the identifier of the first DN, the identifier of the first network slice, and the information used to determine the remaining resource of the terminal in the first network, the first network element may determine the remaining resource of the terminal in the first DN and the first network slice. If the second network element sends the identifier of the terminal, the identifier of the first network slice, and the information used to determine the remaining resource of the terminal in the first network, the first network element may determine the remaining resource of the terminal in the first network slice.

Content of the information used to determine the remaining resource of the terminal in the first network is different, manners of determining the remaining resource of the terminal in the first network by the first network element are different, and manners of sending the information used to determine the remaining resource of the terminal in the first network are also different. Therefore, the following embodiments are separately described.

Case (1): The Information Used to Determine the Remaining Resource of the Terminal in the First Network is Information Used to Indicate the Remaining Resource.

Correspondingly, step 604 may be specifically implemented in the following manner: The second network element sends a data management creation service operation request or a data management update service operation request to the first network element, so that the first network element receives the data management creation service operation request or the data management update service operation request from the second network element. The data management creation service operation request or the data management update service operation request carries the identifier of the terminal, the information used to indicate the remaining resource, and the identifier of the first network. Alternatively, the data management creation service operation request or the data management update service operation request carries the identifier of the first network and the information used to indicate the remaining resource, but does not carry the identifier of the terminal.

Step 601 may be specifically implemented in the following manner: The first network element determines the remaining resource of the terminal in the first network based on the identifier of the terminal, the information used to indicate the remaining resource, and the identifier of the first network. Alternatively, as an alternative, step 601 may be specifically implemented in the following manner: The first network element determines the remaining resource of the terminal in the first network based on the identifier of the first network and the information used to indicate the remaining resource.

In an example, the information used to indicate the remaining resource may be a specific value of the remaining resource, for example, 50 G.

In another example, if the first network element has a subscribed resource of the terminal in the first network, the information used to indicate the remaining resource may alternatively be a proportion of the remaining resource in the subscribed resource. For example, if the subscribed resource is 100 G, and the information used to indicate the remaining resource is 20%, the first network element may determine that the remaining resource is 100 G×20%=20 G.

Case (2): The Information Used to Determine the Remaining Resource of the Terminal in the First Network is Information Used to Indicate a Resource that has been Allocated by the Second Policy Control Network Element.

Correspondingly, step 604 may be specifically implemented in the following manner: The second network element sends, to the first network element, the identifier of the terminal, the identifier of the first network, and the information used to indicate the resource that has been allocated by the second policy control network element. Alternatively, step 604 may be specifically implemented in the following manner: The second network element sends, to the first network element, the identifier of the first network and the information used to indicate the resource that has been allocated by the second policy control network element.

Specifically, the second network element sends an event exposure notification service to the first network element, so that the first network element receives the event exposure notification service from the second network element. The event exposure notification service carries the identifier of the terminal, the identifier of the first network, and the information used to indicate the resource that has been allocated by the second policy control network element. Alternatively, the event exposure notification service carries the identifier of the first network and the information used to indicate the resource that has been allocated by the second policy control network element, but does not carry the identifier of the terminal.

In this case, step 601 may be specifically implemented in the following manner: The first network element determines the remaining resource based on a remaining subscribed resource of the terminal in the first network and the resource that has been allocated.

The remaining subscribed resource indicates remaining usage that is allowed to be authorized by the PCF network element to the terminal in the first network.

It should be understood that, if the second policy control network element is a policy control network element that allocates a resource to the terminal in the first network for the first time, the remaining subscribed resource is the subscribed resource. For example, if the subscribed resource is 100 G, the remaining subscribed resource is also 100 G.

If the second policy control network element is not the policy control network element that allocates the resource to the terminal in the first network for the first time, that is, before the second policy control network element, there is a first resource that has been allocated by another policy control network element to the terminal in the first network, the remaining subscribed resource is a resource obtained by subtracting the first resource that has been allocated by the another policy control network element to the terminal in the first network from the subscribed resource.

For example, if the first resource that has been allocated by the another policy control network element to the terminal in the first network is 40 G, and the subscribed resource is 100 G, the remaining subscribed resource is also 100 G-40 G=60 G.

Specifically, the first network element determines the remaining resource by subtracting the resource that has been allocated from the remaining subscribed resource of the terminal in the first network.

In an example, the information used to indicate the resource that has been allocated by the second policy control network element is a specific value of the resource that has been allocated, for example, 64 G.

In another example, the information used to indicate the resource that has been allocated by the second policy control network element is a proportion of the resource that has been allocated in the remaining subscribed resource. For example, if the remaining subscribed resource is 70 G, and the information used to indicate the resource that has been allocated by the second policy control network element is 2/7, the resource that has been allocated is 70 G×(2/7)=20 G.

As shown in FIG. 6, in some embodiments, the method provided in this embodiment of this application further includes the following steps.

Step 605: The first policy control network element receives the information that is from the first network element and that is used to indicate the remaining resource.

It should be understood that when the first network element is the UDM network element, the first policy control network element may receive, by using the UDR, the information that is from the first network element and that is used to indicate the remaining resource.

Step 606: The first policy control network element makes a policy decision based on the remaining resource determined by using the information used to indicate the remaining resource.

For example, the first policy control network element generates a new PCC rule, modifies or deletes an existing PCC rule, and the like based on the remaining resource determined by using the information used to indicate the remaining resource.

The second network element in this embodiment of this application is a session management network element or the second policy control network element.

In some embodiments, when the second network element is the second policy control network element, step 602 may be specifically implemented in the following manner: When the first network element determines that the first policy control network element exists in policy control network elements corresponding to the first network, the first network element sends, to the first policy control network element, the information used to indicate the remaining resource. The first policy control network element is a policy control network element that is other than the second policy control network element and that is in the policy control network elements corresponding to the first network, or the first policy control network element is a policy control network element that subscribes to a remaining resource change notification from the first network element in the first network.

It should be understood that, if the second network element is the session management network element, the first policy control network element is the policy control network element that subscribes to the remaining resource change notification from the first network element in the first network, or the first policy control network element is one of a plurality of policy control network elements corresponding to the first network, that is, in this case, the first policy control network element may also be the second policy control network element.

For example, if the first network corresponds to a PCF network element 1, a PCF network element 2, and a PCF network element 3, the first policy control network element may be at least one of the PCF network element 1, the PCF network element 2, and the PCF network element 3.

It should be understood that, if there are a plurality of PDU sessions in the first network, and the plurality of PDU sessions have different policy control network elements, the first policy control network element is a policy control network element that manages each of the plurality of PDU sessions.

In some embodiments, when the second network element is the session management network element, step 603 may be specifically implemented in the following manner: The second policy control network element sends, to the second network element, the resource that has been allocated to the terminal in the first network, so that the second network element receives the resource that is from the second policy control network element and that has been allocated to the terminal in the first network.

For example, the second policy control network element may send a session management policy control creation response or a session management policy control update response to the second network element. The session management policy control creation response or the session management policy control update response carries the resource that has been allocated by the second policy control network element to the terminal in the first network.

It should be understood that, if the second network element is the session management network element, when reporting, to the first network element, the resource that has been allocated by the second policy control network element to the terminal in the first network, the second network element may carry an identifier of the second policy control network element. In this way, the first network element may send, to remaining policy control network elements that are other than the second policy control network element and that are in the plurality of policy control network elements corresponding to the first network, the information used to indicate the remaining resource. If the identifier of the second policy control network element is not carried when the second network element reports, to the first network element, the resource that has been allocated by the second policy control network element to the terminal in the first network, the first network element may send, to the plurality of policy control network elements corresponding to the first network, the information used to indicate the remaining resource.

In some embodiments, if the second network element is the second policy control network element, step 603 may be specifically implemented in the following manner: The second policy control network element obtains the remaining subscribed resource from the UDR in a session management policy association establishment procedure or a session management policy association modification procedure, to make a policy decision based on the remaining subscribed resource, and formulate a policy and charging control (PCC) rule and another PDU session-related policy, so that the resource that has been allocated to the terminal in the first network can be obtained.

Figure 7:
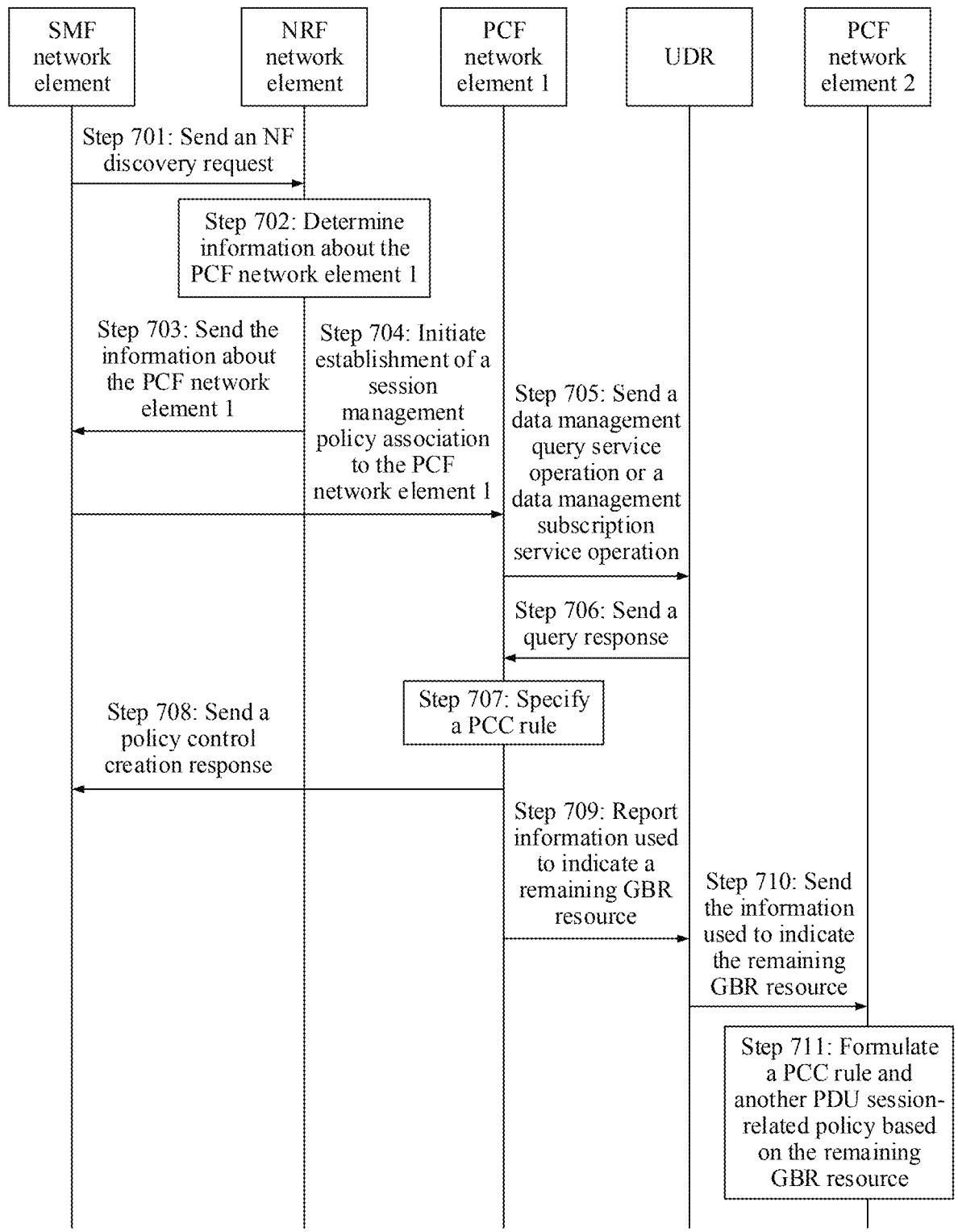
FIG. 7 is a schematic flowchart 2 of a resource information sending method according to an embodiment of this application.

For example, the communications system shown in FIG. 2 is applied to the 5G network shown in FIG. 3a, the first network element is the UDR, the second network element is the PCF network element 1, the first policy control network element is the PCF network element 2, the resource is a GBR resource, and the first network includes the first DN and the first network slice. FIG. 7 shows a resource information sending method according to an embodiment of this application. The resource information sending method includes the following steps.

Step 701: An SMF network element sends an NF discovery request (NF Discovery_request) to an NRF network element, so that the NRF receives the NF discovery request.

The NF discovery request includes at least one of a DNN and S-NSSAI, and is used to determine to obtain information about the PCF network element 1, for example, used to determine an IP address (which may be an IPv4 address or an IPv6 prefix) or an FQDN of the PCF network element 1.

For example, the SMF network element may send the NF discovery request to the NRF through an Nnrf service-based interface.

Step 702: The NRF network element determines the information about the PCF network element 1 based on the NF discovery request.

Step 703: The NRF network element sends the information about the PCF network element 1 to the SMF network element.

Step 704: The SMF network element initiates a session management policy association creation (Npcf SMPolicyControl_Create) service operation to the PCF network element 1 based on the information about the PCF network element 1, so that the PCF network element 1 receives the session management policy association creation service operation.

Establishment of a policy association includes identification information of a terminal and at least one of the following information: a DNN and S-NSSAI.

For example, the identification information of the terminal may be an SUPI.

For example, the SMF network element may request, through an Npcf service-based interface, the PCF network element 1 to establish a policy association service operation.

Step 705: The PCF network element 1 sends a data management query service operation request or a data management subscription service operation (Nudr_DM_Query&Nudr_DM_Subscribe) request to the UDR, so that the UDR receives the data management query service operation request or the data management subscription service operation request from the PCF network element 1. In this way, the PCF network element 1 may obtain a subscribed (Subscribed) GBR resource of the terminal in the first network from the UDR.

For example, the UDR in step 705 and step 706 may be a UDR that stores subscription data of the terminal (which is embodied as that a data key of a data management query service operation or a data management subscription service operation is the SUPI), or a UDR that stores information about the first network (which is embodied as that a data key is the S-NSSAI or the DNN). For example, the information about the first network may be information about the first network slice or information about the first DN.

The data management query service operation request or the data management subscription service operation request includes an identifier of the terminal, the S-NSSAI, and the DNN, and is used to query session policy-related subscription information. Alternatively, the data management query service operation request or the data management subscription service operation request includes the S-NSSAI and the DNN, and is used to query session policy-related subscription information, for example, used to query the session policy-related subscription information, for example, PDU session policy control data (PDU session policy control data) and a remaining subscribed resource (remaining allowed usage data). The PDU session policy control data may include, for example, a subscribed guaranteed bit rate (GBR) resource, and the subscribed GBR resource indicates a maximum guaranteed bandwidth (for example, the subscribed GBR resource is specifically used to indicate a maximum guaranteed bit rate (Maximum aggregate bitrate) that may be provided for the terminal in all GBR quality of service flows (QoS Flows) in the first network slice and the first DN) that is allowed to be authorized by the PCF network element to the terminal. The remaining subscribed resource indicates remaining usage that is allowed to be authorized by the PCF network element to the terminal.

It should be noted that when obtaining the subscribed (Subscribed) GBR resource of the terminal in the first network from the UDR, the PCF network element may further perform the following operation: The PCF network element pre-obtains a specific threshold. That is, after a PCC rule with a GBR parameter is generated/modified/deleted or another operation that affects a resource is performed, the PCC rule may not be immediately stored in or obtained from the UDR. Instead, the PCC rule is autonomously controlled by the PCF network element within a specific threshold range, and does not interact with the UDR.

For example, a value, of the subscribed GBR resource of the terminal in the first network, that is stored in the UDR is 50 G, and the PCF network element 1 pre-obtains 30 G (in this case, another PCF network element 2 uses a maximum of 20 G). The PCF network element 1 may self-authorize the 30 G resource. When determining that the pre-obtained threshold changes (for example, when a serving PDU session is released), the PCF network element 1 releases the resource to the UDR, that is, changes the value stored in the UDR back to 50 G. For a specific process of interaction between the PCF network element and the UDR in this embodiment of this application, refer to the descriptions herein. Descriptions are uniformly provided herein, and details are not described subsequently again.

Step 706: The UDR sends a query response (Nudr DM_Query response) to the PCF network element 1, so that the PCF network element receives the query response from the UDR.

The query response includes the session policy-related subscription information.

Step 707: The PCF network element 1, based on the session management policy association creation service operation sent by the SMF network element and the obtained session policy-related subscription information, makes a policy decision (Policy Decision), and formulates a policy charging control (PCC) rule and another PDU session-related policy.

Step 708: The PCF network element 1 sends a session management policy control creation response (Npcf_SM-PolicyControl_Create Response) to the SMF network element.

The session management policy control creation response includes a session policy formulated by the PCF network element 1. For example, the PCF network element 1 allocates a GBR resource to the terminal in the first network. Alternatively, the PCF network element 1 rejects establishment of the PDU session, triggers release of the PDU session, or the like based on attribute information of the first network slice.

It should be understood that the GBR resource allocated by the PCF network element 1 to the terminal in the first network may be a GBR resource allocated from a subscribed GBR resource, or may be a GBR resource allocated from the remaining subscribed resource, for example, the GBR resource allocated by the PCF network element 1 to the PDU session of the terminal in the first network. Herein, the PDU session in the first network may be one or more PDU sessions managed by the PCF network element 1. Specifically, the GBR resource may be a GBR resource allocated by the PCF network element 1 to an application of the terminal in the PDU session in the first network.

Step 709: If the PCC rule sent by the PCF network element 1 to the SMF network element includes the GBR resource that has been allocated, the PCF network element 1 reports, to the UDR, information used to indicate a remaining GBR resource.

The information used to indicate the remaining GBR resource is used to determine the remaining GBR resource of the terminal in the first network. The remaining GBR resource is a subscribed GBR resource currently available to the terminal in the first network.

It should be understood that the PCF network element 1 may determine the remaining GBR resource of the terminal in the first network in the following manner: The PCF network element 1 determines the remaining GBR resource based on the subscribed GBR resource of the terminal in the first network and the GBR resource that has been allocated.

That is, the PCF network element 1 determines the remaining GBR resource of the terminal in the first network by subtracting the GBR resource that has been allocated from the subscribed GBR resource of the terminal in the first network.

For example, the PCF network element 1 may send a data management creation service operation request (Nudr_DM_Create) or a data management update (Nudr DM Update) service operation request to the UDR through an Nudr service-based interface. The data management creation service operation request or the data management update service operation request carries the information used to indicate the remaining GBR resource.

In some embodiments, the PCF network element 1 may further report identification information (for example, the SUPI) of the terminal, identification information (for example, the S-NSSAI) of the first network, or the DNN to the UDR. In this way, after receiving the SUPI, the S-NSSAI, or the DNN, the UDR may store the remaining GBR resource of the terminal in the first network. For example, as listed in Table 1:

TABLE 1

GBR resource stored in a network

| Data key (data key) | Data subkey (data subkey) | Subscribed GBR resource | Remaining GBR resource |
| --- | --- | --- | --- |
| SUPI 1 | DNN 1 S-NSSAI 1 | 100 kbps | 60 kbps |
|  | DNN 2 S-NSSAI 2 | 10 kbps | 5 kbps |
| SUPI 2 | DNN 1 S-NSSAI 2 | 100 bps | 30 kbps |

Step 710: After the UDR receives, from the PCF network element 1, the information used to indicate the remaining GBR resource, if the UDR determines that the PCF network element 2 still exists in the first network, the UDR sends, to the PCF network element 2, the information used to indicate the remaining GBR resource, so that the PCF network element 2 receives, from the UDR, the information used to indicate the remaining GBR resource.

In some embodiments, in step 710, the UDR may further send an identifier of the first network slice and an identifier of the first DN to the PCF network element 2.

It should be understood that the terminal may request to establish a plurality of PDU sessions to a same first network slice and a same first DN. For different PDU sessions, an AMF network element may select different SMF network elements, and different SMF network elements may select different PCF network elements (for example, the PCF network element 1 and the PCF network element 2). For example, the PCF network element 1 is configured to manage a PDU session 1, and the PCF network element 2 is configured to manage a PDU session 2. The PDU session 1 and the PDU session 2 are two of a plurality of PDU sessions established by the terminal to the same first network slice and the same first data network.

In some embodiments, the PCF network element 2 may be a PCF network element that is other than the PCF network element 1 and that is in policy control network elements corresponding to the first network, or may be a policy control network element that subscribes to a remaining resource change notification from the UDR.

Step 711: After determining the remaining GBR resource, the PCF network element 2 formulates, based on the remaining GBR resource, a PCC rule and another PDU session-related policy.

It should be understood that, after determining the remaining GBR resource, the PCF network element 2 may allocate, from the remaining GBR resource, a GBR resource to the terminal in the first network. Therefore, this can avoid a problem that a conflict occurs between a GBR resource allocated to at least one of a same DN and a same network slice of a same terminal and a subscribed GBR resource of at least one of the DN and the network slice.

It should be understood that the UDR in step 709 and step 710 in FIG. 7 may be replaced with a BSF network element or a UDM network element. The PCF network element 1 or the PCF network element 2 may directly interact with the BSF. If the UDR in step 709 and step 710 replaces the UDM network element, the UDM network element interacts with the PCF network element by using the UDR.

An acting of processing the information by the PCF network element 1 or the UDR in step 701 to step 711 may be performed by the processor 401 in the communications device 400 shown in FIG. 5 by invoking the application program code stored in the memory 403, and an action of receiving or sending the information by the PCF network element 1 or the UDR may be performed through the communications interface 404 in the communications device 400 shown in FIG. 5. This is not limited in this embodiment.

It should be understood that, in FIG. 7, an example in which the resource information sending method is applied to the non-roaming 5G network architecture shown in FIG. 3a is used. It may be understood that, when the resource information sending method shown in FIG. 7 is applied to the home routed scenario shown in FIG. 3c or FIG. 3d, the second network element may be replaced with an H-SMF network element or an H-PCF network element. The first network element may be replaced with any one of the UDM network element, the UDR network element, or the BSF network element. When the resource information sending method shown in FIG. 7 is applied to the local breakout scenario shown in FIG. 3e or FIG. 3f, the second network element may be replaced with a V-SMF network element or a V-PCF network element. The first network element may be replaced with any one of the UDR network element, the BSF network element, and the UDM network element.

Figure 8:
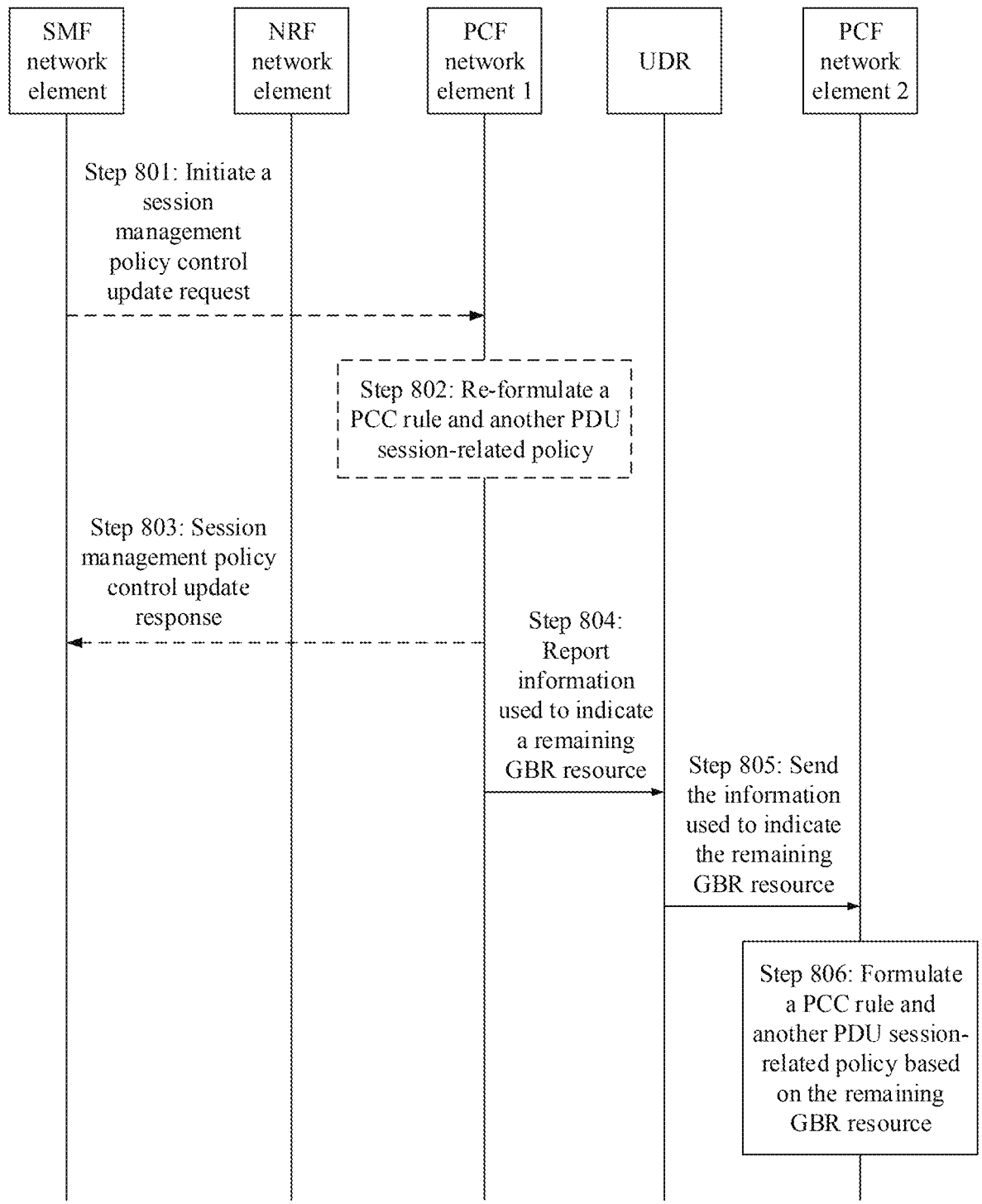
FIG. 8 is a schematic flowchart 3 of a resource information sending method according to an embodiment of this application.

FIG. 8 shows another resource information sending method, and the method may be applied to the communications system shown in FIG. 2. For example, a first network element is the UDR in FIG. 3a, a second network element is the PCF network element 1 in FIG. 3a, and a first policy control network element is the PCF network element 2. A difference between the method and FIG. 7 lies in that in FIG. 8, the PCF network element 1 modifies a PCC rule in a first network for a terminal in a session management policy association modification procedure initiated by an SMF network element, and determines a remaining GBR resource. The detailed process is as follows.

Step 801: The SMF network element initiates a session management policy control update (Npcf_SMPolicyControl_Update request) request to the PCF network element 1, so that the PCF network element 1 receives the session management policy control update request.

The session management policy control update request carries trigger information, and the trigger information is used to indicate that the SMF network element encounters some cases that affect a policy decision.

For example, the trigger information may be terminal location change, access technology type change, or the like.

In some embodiments, the session management policy control update request may further carry an identifier (for example, an SUPI) of the terminal, a DNN, or S-NSSAI.

For example, the SMF network element may initiate the session management policy control update request to the PCF network element 1 through an Npcf service-based interface.

Step 802: The PCF network element 1 re-formulates a PCC rule and another PDU session-related policy based on the session management policy control update request.

Step 803: The PCF network element 1 sends a session management policy control update response (Npcf_SMPolicyControlUpdate response) to the SMF network element.

The session management policy control update response carries the PCC rule re-formulated by the PCF network element 1 and the another PDU session-related policy. For example, the session management policy control update response may include GBR resource information (as listed in Table 2), indicate a quantity of GBR resources to be allocated to an application, and cause change of the GBR resources that have been allocated.

TABLE 2

| GBR resource information included | |
| --- | --- |
| UL-guaranteed bitrate | The uplink guaranteed bitrate authorized for the service data flow |
| DL-guaranteed bitrate | The downlink guaranteed bitrate authorized for the service data flow |

Step 804 to step 806 are the same as step 709 to step 711 in the embodiment shown in FIG. 7. For related descriptions, refer to the embodiment shown in FIG. 7. Details are not described herein again.

It should be understood that the UDR in step 804 and step 805 in FIG. 8 may be replaced with a BSF network element or a UDM network element. The PCF network element 1 or the PCF network element 2 may directly interact with the BSF. If the UDR in step 804 and step 805 replaces the UDM network element, the UDM network element interact with the PCF network element by using the UDR.

An acting of processing the information by the PCF network element 1 or the UDR in step 801 to step 806 may be performed by the processor 401 in the communications device 400 shown in FIG. 5 by invoking the application program code stored in the memory 403, and an action of receiving or sending the information by the PCF network element 1 or the UDR may be performed through the communications interface 404 in the communications device 400 shown in FIG. 5. This is not limited in this embodiment.

It should be understood that, in FIG. 8, an example in which the resource information sending method is applied to the non-roaming 5G network architecture shown in FIG. 3*a* is used. It may be understood that, when the resource information sending method shown in FIG. 8 is applied to the home routed scenario shown in FIG. 3*c* or FIG. 3*d*, the second network element may be replaced with an H-SMF network element or an H-PCF network element. The first network element may be replaced with any one of the UDM network element, the UDR network element, or the BSF network element. When the resource information sending method shown in FIG. 8 is applied to the local breakout scenario shown in FIG. 3*e* or FIG. 3*f*, the second network element may be replaced with a V-SMF network element or a V-PCF network element. The first network element may be replaced with any one of the UDR network element, the BSF network element, and the UDM network element.

Figure 9:
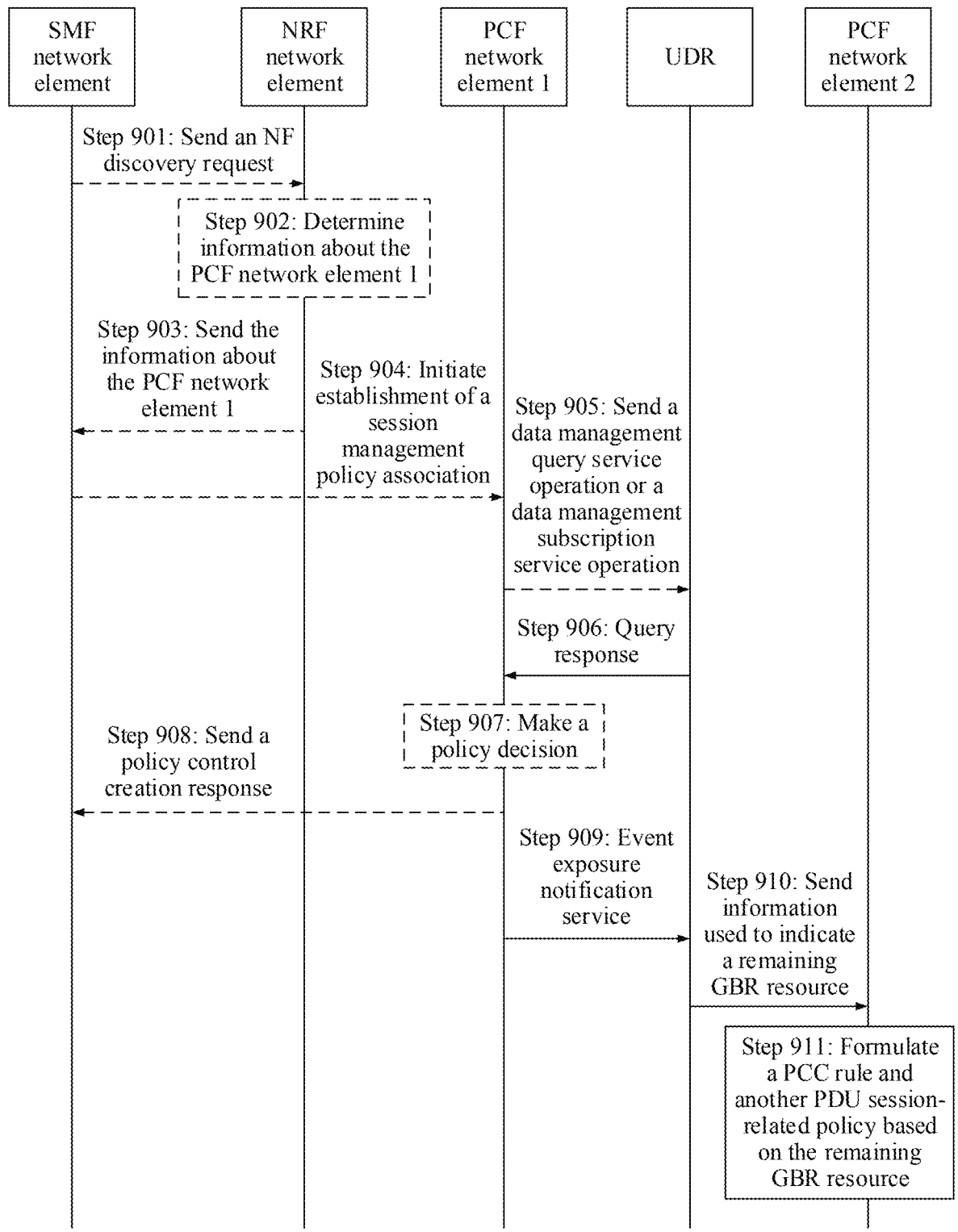
FIG. 9 is a schematic flowchart 4 of a resource information sending method according to an embodiment of this application.

FIG. 9 shows another resource information sending method, and the method may be applied to the communications system shown in FIG. 2. For example, a first network element is the UDR in FIG. 3*a*, a second network element is the PCF network element 1 in FIG. 3*a*, and a first policy control network element is the PCF network element 2. A difference between the method and FIG. 7 lies in that, in FIG. 7, a remaining GBR resource is calculated by the PCF network element 1, and in FIG. 9, a remaining GBR resource is calculated by the UDR. The method specifically includes the following steps.

Step 901 to step 908 are the same as step 701 to step 708 in the embodiment shown in FIG. 7. For related descriptions, refer to the embodiment shown in FIG. 7. Details are not described herein again.

Step 909 is similar to step 709 in the embodiment shown in FIG. 7. For example, a difference lies in that, if a PCC rule sent by the PCF network element 1 to an SMF network element includes a GBR resource that has been allocated, the PCF network element 1 sends an event exposure notification service (Npcf_EventExposure_Notify) to the UDR.

The event exposure notification service carries information used to indicate the GBR resource that has been allocated.

In some embodiments, the event exposure notification service may further carry an SUPI, a DNN, and S-NSSAI. In this way, after obtaining a remaining GBR resource based on the GBR resource that has been allocated and a subscribed GBR resource, the UDR may store a relationship between the SUPI, the DNN, the S-NSSAI, and the remaining GBR resource.

Step 910: After obtaining the remaining GBR resource through calculation based on the GBR resource that has been allocated and the subscribed GBR resource, the UDR sends, to the PCF network element 2, information used to indicate the remaining GBR resource, so that the PCF network element 2 receives, from the UDR, the information used to indicate the remaining GBR resource.

Step 911 is the same as step 711 in FIG. 7. For related descriptions, refer to the embodiment shown in FIG. 7. Details are not described herein again.

An acting of processing the information by the PCF network element 1 or the UDR in step 901 to step 911 may be performed by the processor 401 in the communications device 400 shown in FIG. 5 by invoking the application program code stored in the memory 403, and an action of receiving or sending the information by the PCF network element 1 or the UDR may be performed through the communications interface 404 in the communications device 400 shown in FIG. 5. This is not limited in this embodiment.

Figure 10:
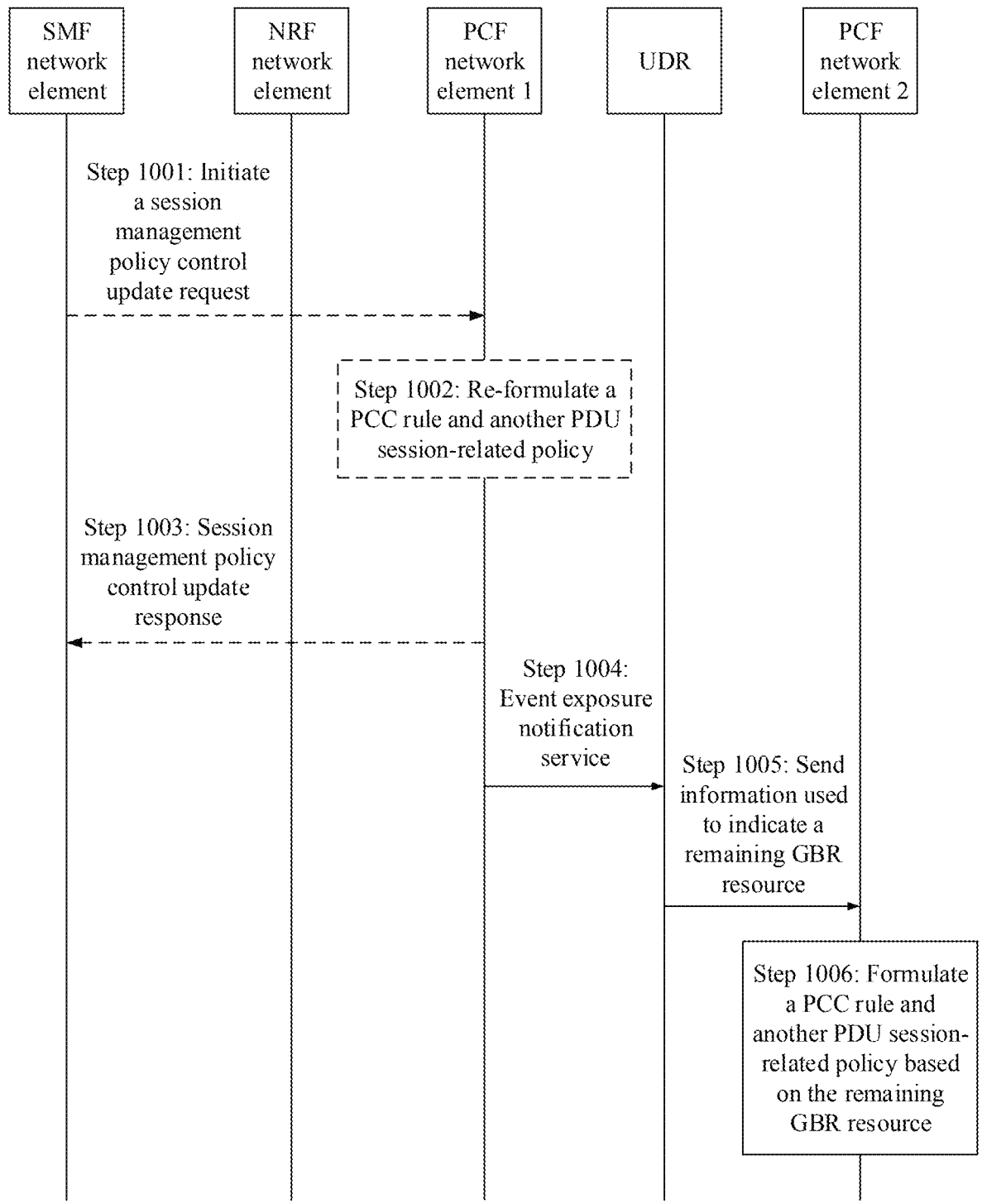
FIG. 10 is a schematic flowchart 5 of a resource information sending method according to an embodiment of this application.

FIG. 10 shows another resource information sending method, and the method may be applied to the communications system shown in FIG. 2. For example, a first network element is the UDR in FIG. 3*a*, and a second network element is the PCF network element 1 in FIG. 3*a*. A difference between the method and the method in FIG. 8 lies in that, in FIG. 10, the PCF network element 1 reports, to the UDR, information used to indicate a GBR resource that has been allocated, and the UDR calculates a remaining GBR resource. The detailed process is as follows.

Step 1001 to step 1003 are the same as step 801 to step 803 in the embodiment shown in FIG. 8. For related descriptions, refer to the embodiment shown in FIG. 8. Details are not described herein again.

Step 1004 is similar to step 804 in the embodiment shown in FIG. 8. For example, a difference lies in that, if a PCC rule sent by the PCF network element 1 to an SMF network element includes a GBR resource that has been allocated, the PCF network element 1 sends an event exposure notification service (Npcf_EventExposure_Notify) to the UDR.

The event exposure notification service carries information used to indicate the GBR resource that has been allocated.

In some embodiments, the event exposure notification service may further carry an SUPI, a DNN, and S-NSSAI. In this way, after obtaining a remaining GBR resource based on the GBR resource that has been allocated and a subscribed GBR resource, the UDR may store a relationship between the SUPI, the DNN, the S-NSSAI, and the remaining GBR resource.

Step 1005: After obtaining the remaining GBR resource through calculation based on the GBR resource that has been allocated and the subscribed GBR resource, the UDR sends, to the PCF network element 2, information used to indicate the remaining GBR resource, so that the PCF network element 2 receives, from the UDR, the information used to indicate the remaining GBR resource.

Step 1006 is the same as step 806 in FIG. 8. For related descriptions, refer to the embodiment shown in FIG. 8. Details are not described herein again.

It should be understood that the UDR in step 1004 and step 1005 in FIG. 10 may be replaced with a BSF network element or a UDM network element. The PCF network element 1 or the PCF network element 2 may directly interact with the BSF. If the UDR in step 1004 and step 1005 in FIG. 10 replaces the UDM network element, the UDM network element interact with the PCF network element by using the UDR.

An acting of processing the information by the PCF network element 1 or the UDR in step 1001 to step 1006 may be performed by the processor 401 in the communications device 400 shown in FIG. 5 by invoking the application program code stored in the memory 403, and an action of receiving or sending the information by the PCF network element 1 or the UDR may be performed through the communications interface 404 in the communications device 400 shown in FIG. 5. This is not limited in this embodiment.

It should be understood that, in FIG. 9 or FIG. 10, an example in which the resource information sending method is applied to the non-roaming 5G network architecture shown in FIG. 3*a* is used. It may be understood that, when the resource information sending method shown in FIG. 9 or FIG. 10 is applied to the home routed scenario shown in FIG. 3*c* or FIG. 3*d*, the second network element may be replaced with an H-SMF network element or an H-PCF network element. The first network element may be replaced with any one of the UDM network element, the UDR network element, or the BSF network element. When the resource information sending method shown in FIG. 9 or FIG. 10 is applied to the local breakout scenario shown in FIG. 3*e* or FIG. 3*f*, the second network element may be replaced with a V-SMF network element or a V-PCF network element. The first network element may be replaced with any one of the UDR network element, the BSF network element, and the UDM network element.

Figure 11:
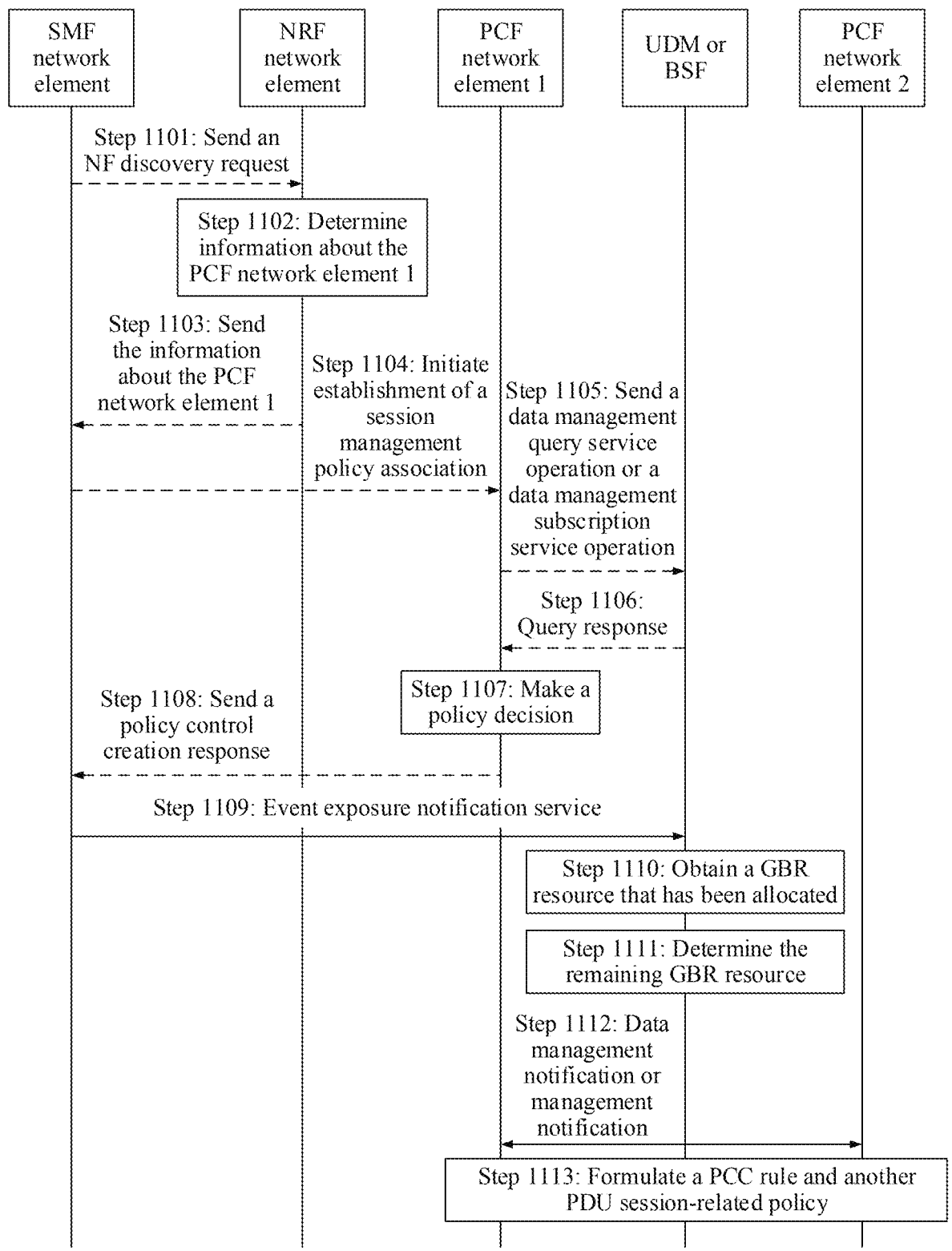
FIG. 11 is a schematic flowchart 6 of a resource information sending method according to an embodiment of this application.

For example, FIG. 11 shows another resource information sending method, and the method may be applied to the communications system shown in FIG. 2. For example, a first network element is the UDM or the BSF shown in FIG. 3*a*, a second network element is the SMF network element shown in FIG. 3*a*, and a first policy control network element is the PCF network element 2. A difference between the method and the method in FIG. 7 lies in that, in FIG. 7, the PCF network element 1 reports information about a remaining GBR resource to a UDR, and in FIG. 11, the SMF network element reports the information about the remaining GBR resource to the UDR. The detailed process is as follows.

Step 1101 to step 1108 are the same as step 701 to step 708 in the embodiment shown in FIG. 7. For related descriptions, refer to the embodiment shown in FIG. 7. Details are not described herein again.

It should be understood that if the SMF network element obtains a GBR resource that has been allocated in a session management policy association establishment procedure, step 1101 to step 1108 are the same as step 701 to step 708 in the embodiment shown in FIG. 7. If the SMF network element obtains a GBR resource that has been allocated in a session management policy association modification procedure, step 1101 to step 1108 are the same as step 801 to step 806 in the embodiment shown in FIG. 8. For related descriptions, refer to the embodiment shown in FIG. 8. Details are not described herein again.

Step 1109: The SMF network element sends an event exposure notification service to the UDM or the BSF.

The event exposure notification service includes the GBR resource that has been allocated.

In some embodiments, the event exposure notification service may further carry an SUPI, a DNN, and S-NSSAI. In this way, after obtaining a remaining GBR resource based on the GBR resource that has been allocated and a subscribed GBR resource, the UDR may store a relationship between the SUPI, the DNN, the S-NSSAI, and the remaining GBR resource.

Certainly, step 1109 may be alternatively replaced in the following manner: The event exposure notification service sent by the SMF network element to the UDM or the BSF carries the information used to indicate the remaining GBR resource. In this case, the SMF network element may further obtain session policy-related subscription information from the UDR or the PCF network element 1.

Step 1110: The UDM or the BSF receives the event exposure notification service from the SMF network element, to obtain the GBR resource that has been allocated.

Step 1111: The UDM or the BSF determines the remaining GBR resource based on the GBR resource that has been allocated and the subscribed GBR resource.

Step 1112: The UDM sends a data management notification (Nudr_DM_Notify) to the PCF network element 1 and the PCF network element 2, or the BSF sends a management notification (Nbsf_Management_Notify) to the PCF network element 1 and the PCF network element 2.

The data management notification or the management notification carries the information used to indicate the remaining GBR resource.

It should be understood that the PCF network element 1 and the PCF network element 2 may be any two of a plurality of policy control network elements corresponding to the first network. The PCF network element 1 and the PCF network element 2 may alternatively be policy control network elements that subscribe to a remaining resource change notification from the UDM or the BSF.

Step 1113: The PCF network element 1 and the PCF network element 2 formulate, based on the remaining GBR resource, a PCC rule and another PDU session-related policy.

An acting of processing the information by the UDM or the BSF or the SMF network element in step 1101 to step 1113 may be performed by the processor 401 in the communications device 400 shown in FIG. 5 by invoking the application program code stored in the memory 403, and an action of receiving or sending the information by the UDM or the BSF or the SMF network element may be performed through the communications interface 404 in the communications device 400 shown in FIG. 5. This is not limited in this embodiment.

Definitely, in the embodiment shown in FIG. 11, step 1101 to step 1108 may be alternatively replaced with step 801 to step 803 shown in FIG. 8. To be specific, the SMF network element obtains the remaining GBR resource from the PCF network element 1 by using a session management policy control procedure, and then reports, to the UDM or the BSF, the information used to indicate the remaining GBR resource. Alternatively, step 1101 to step 1108 may be replaced with step 1001 to step 1003 shown in FIG. 10, that is, the SMF network element obtains the GBR resource that has been allocated from the PCF network element 1 by using a session management policy control procedure.

It should be understood that, in FIG. 10 or FIG. 11, an example in which the resource information sending method is applied to the non-roaming 5G network architecture shown in FIG. 3a is used. It may be understood that, when the resource information sending method shown in FIG. 10 or FIG. 11 is applied to the home routed scenario shown in FIG. 3c or FIG. 3d, the second network element may be replaced with an H-SMF network element. The first network element may be replaced with any one of the UDM network element, the UDR network element, or the BSF network element. When the resource information sending method shown in FIG. 10 or FIG. 11 is applied to the local breakout scenario shown in FIG. 3e or FIG. 3f, the second network element may be replaced with a V-SMF network element. The first network element may be replaced with any one of the UDR network element, the BSF network element, and the UDM network element.

Figure 12:
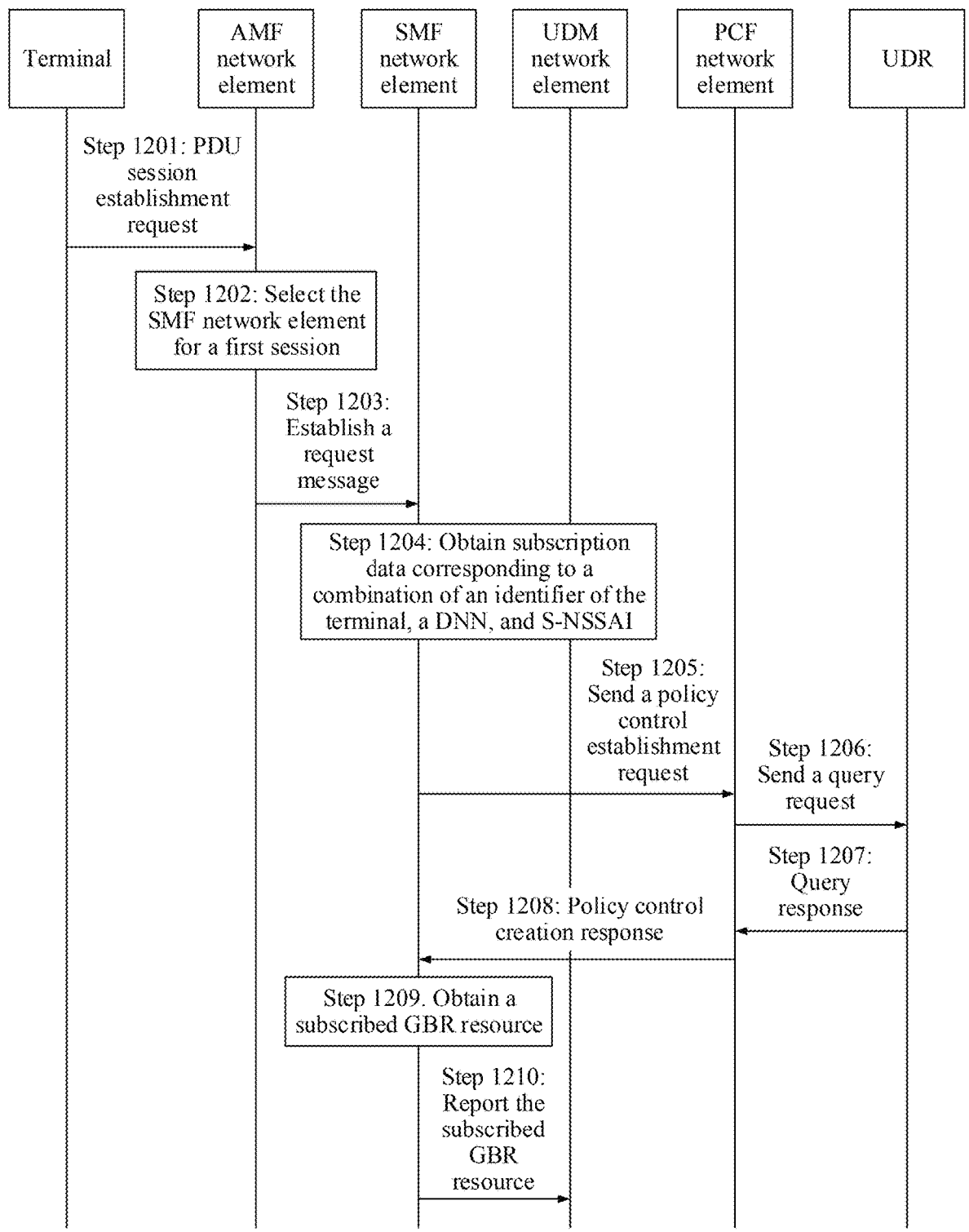
FIG. 12 is a schematic flowchart 7 of a resource information sending method according to an embodiment of this application.

It should be understood that the UDM or the BSF has the subscribed GBR resource in step 1111. On the one hand, the subscribed GBR resource in the UDM or the BSF may be obtained from the UDR. For example, the UDR directly duplicates a subscribed GBR from subscription information and uses/directly uses the subscribed GBR in the subscription information. On the other hand, as shown in FIG. 12, the subscribed GBR resource in the UDM or the BSF may be obtained from the SMF network element when a PDU session is established for the first time. The detailed process is as follows.

Step 1201: A terminal sends a PDU session establishment request (PDU session establishment request) to an AMF network element, so that the AMF network element receives the PDU session establishment request from the terminal.

The PDU session establishment request includes a PDU session identifier, and is used to request to establish a first session.

In some embodiments, the PDU session establishment request in this embodiment of this application may further include at least one of S-NSSAI or a DNN. This is not specifically limited in this embodiment of this application.

In this embodiment of this application, the AMF network element may determine, based on at least one of subscription data of the terminal, an operator policy, or the PDU session establishment request from the terminal, the S-NSSAI and the DNN that correspond to the first session.

The first session herein may be a PDU session established between the terminal and the S-NSSAI or the DNN.

Step 1202: The AMF network element selects an SMF network element for the first session.

For a manner in which the AMF network element selects the SMF network element and a PCF network element for the first session, details are not described herein.

Step 1203: The AMF network element sends, to the SMF network element, an establishment request message used to establish the first session, so that the SMF network element receives the establishment request message from the AMF network element.

The establishment request message includes an identifier of the terminal, the S-NSSAI, the DNN, and the PDU session identifier.

In some embodiments, the establishment request message in this embodiment of this application may be, for example, a PDU session establishment session management (session management, SM) context request (Nsmf_PDU Session_Create SM context request) message. This is not specifically limited in this embodiment of this application.

Step 1204: The SMF network element registers the first session with a UDM network element, and the SMF network element obtains, from the UDM network element, session management subscription data (session management subscription data) corresponding to a combination of the identifier of the terminal, the DNN, and the S-NSSAI.

In addition, in this embodiment of this application, the SMF network element may further subscribe to a subscription data change notification from the UDM network element. This is not specifically limited in this embodiment of this application.

For related implementation of step 1204, details are not described herein.

It should be understood that after the first session is registered with the UDM network element, the SMF network element may further send a PDU session establishment session management context (Nsmf_PDU Session_Create SM context response) response to the AMF network element.

Step 1205: After selecting the PCF network element for the first session, the SMF network element sends a policy control establishment request to the PCF network element, so that the PCF network element receives the policy control establishment request from the SMF network element.

The policy control establishment request may include the identifier of the terminal, the PDU session identifier, the DNN, the S-NSSAI, and an internet protocol (IP) address allocated by the SMF network element to the first session.

In this embodiment of this application, the SMF network element may select the PCF network element for the first session based on a local policy, the identifier (which is PCF ID herein) that is of the PCF network element and that is sent by the AMF network element, or in a manner such as performing interaction with a network repository function (NRF) network element. For details, refer to an existing implementation. Details are not described herein.

Step 1206: The PCF network element sends a query request (query request) to the UDR network element, so that the UDR network element receives the query request from the PCF network element.

The query request includes the identifier of the terminal, the S-NSSAI, and the DNN, and is used to query session policy-related subscription information, for example, PDU session policy control data (PDU session policy control data) and a remaining subscribed resource (remaining allowed usage data). The PDU session policy control data may include, for example, a subscribed guaranteed bit rate (GBR), and the subscribed GBR indicates a maximum guaranteed bandwidth that is allowed to be authorized by the PCF network element to the terminal. The remaining subscribed resource indicates remaining usage that is allowed to be authorized by the PCF network element to the terminal.

Step 1207: The UDR network element sends a query response (query response) to the PCF network element, so that the PCF network element receives the query response from the UDR network element.

The query response includes the session policy-related subscription information.

Step 1208: The PCF network element makes a policy decision based on the obtained subscription information related to the session policy, and after formulating a PCC rule and another PDU session-related policy, the PCF network element sends a policy control creation response (policy control created response) to the SMF network element, so that the SMF network element receives the policy control creation response from the PCF network element.

Step 1209: The SMF network element obtains the subscribed GBR resource from the PCF network element.

Step 1210: The SMF network element reports the obtained subscribed GBR resource to the UDM or the BSF.

For example, the SMF network element may report the obtained subscribed GBR resource to the UDM or the BSF by using a subscribed GBR resource report (Subscribe GBR Report).

It may be understood that, in FIG. 12, an example in which the SMF network element reports the obtained subscribed GBR resource to the UDM is used.

Figure 13:
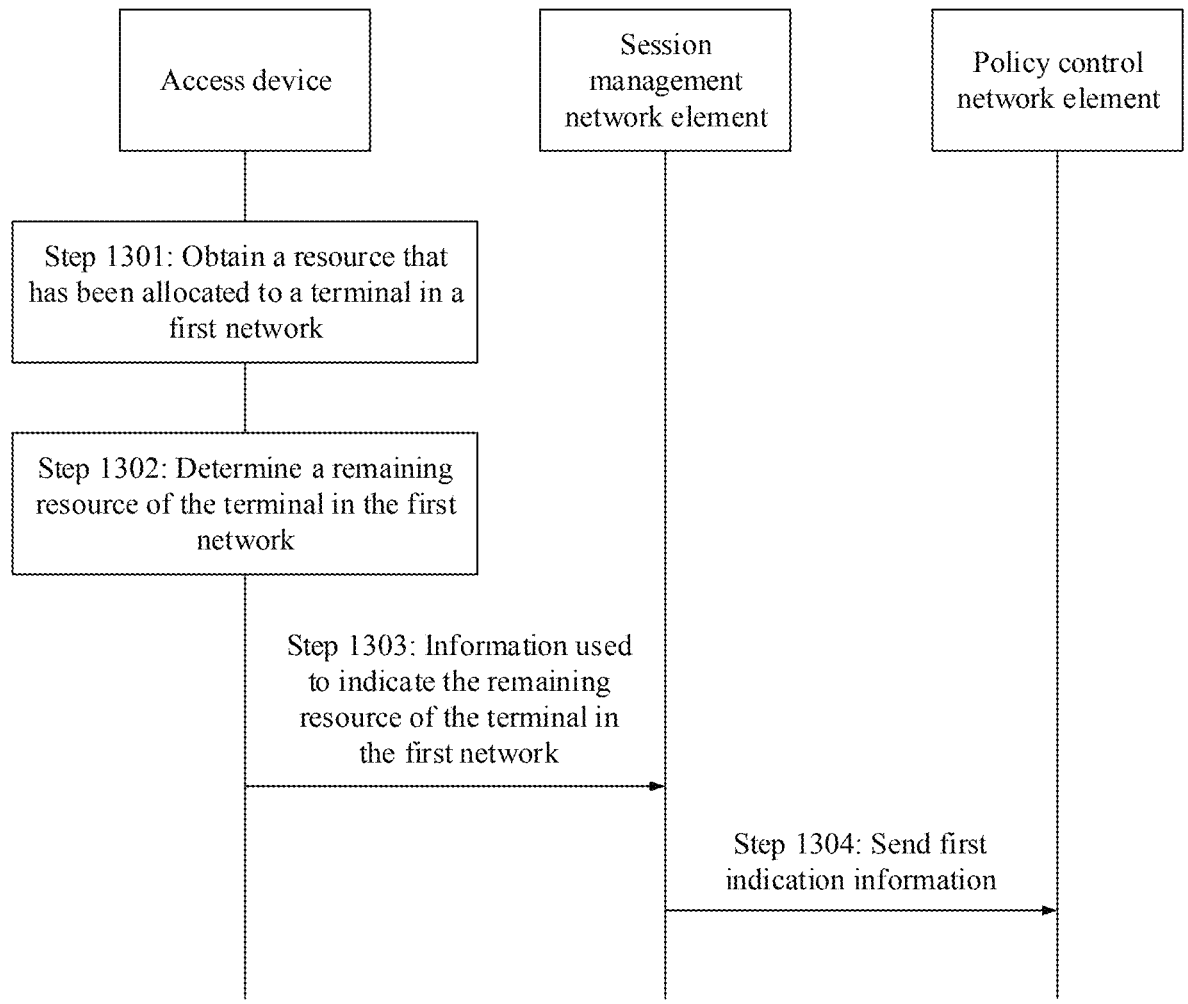
FIG. 13 is a schematic flowchart 8 of a resource information sending method according to an embodiment of this application.

FIG. 13 shows another resource information sending method according to an embodiment of this application. The method includes the following steps.

Step 1301: An access device obtains a resource that has been allocated to a terminal in a first network, where the first network includes at least one of a first DN and a first network slice.

Step 1302: The access device determines a remaining resource of the terminal in the first network based on a remaining subscribed resource of the terminal in the first network and the resource that has been allocated.

It should be understood that before the access device obtains the resource that has been allocated in step 1301, a third policy control network element in a plurality of policy control network elements corresponding to the first network has allocated a first resource to the terminal in the first network, in this case, the remaining subscribed resource is obtained by subtracting the first resource allocated by the third policy control network element to the terminal in the first network from a subscribed resource of the terminal in the first network.

Before the access device obtains the resource that has been an Npcf allocated in step 1301, any one of the plurality of policy control network elements corresponding to the first network has not allocated a resource to the terminal in the first network (that is, the resource that has been allocated in step 1301 is a resource allocated from the subscribed resource of the terminal in the first network for the first time). In this case, the remaining subscribed resource is the subscribed resource of the terminal in the first network.

In some embodiments, the method provided in this embodiment of this application further includes: The access device obtains the subscribed resource of the terminal in the first network. For example, the access device obtains the subscribed resource of the terminal in the first network from UDM or a policy control network element through an AMF network element.

Step 1303: The access device sends, to a session management network element, information used to indicate the remaining resource of the terminal in the first network, so that the session management network element receives the information that is from the access device and that is used to indicate the remaining resource of the terminal in the first network.

In some embodiments, in step 1303, the access device further sends an identifier of the terminal and an identifier of the first network to the session management network element, so that the session management network element receives the identifier of the terminal and the identifier of the first network from the access device. In this way, the session management network element determines the remaining resource of the terminal in the first network based on the identifier of the terminal, the identifier of the first network, and the information used to indicate the remaining resource.

For example, step 1303 may be specifically implemented in the following manner: The access device sends a subscribed resource report to the session management network element, where the subscribed resource report carries the identifier of the terminal, the identifier of the first network, and the information used to indicate the remaining resource.

For example, the access device may send, to the session management network element through the AMF network element, the information used to indicate the remaining resource. That is, the access device sends, to the AMF network element, the identifier of the terminal, the identifier of the first network, and the information used to indicate the remaining resource. Then, the AMF network element sends, to the session management network element, the identifier of the terminal, the identifier of the first network, and the information used to indicate the remaining resource.

It should be understood that the session management network element in step 1303 is a session management network element corresponding to the first network. If a plurality of PDU sessions in the first network correspond to a same session management network element, the session management network element is a session management network element corresponding to the plurality of PDU sessions. If a plurality of PDU sessions in the first network correspond to a plurality of different session management network elements, the session management network elements are a plurality of different session management network elements corresponding to the plurality of PDU sessions.

It should be understood that when receiving the identifier of the first network, the AMF network element may determine, based on the identifier of the first network, the session management network element corresponding to the first network.

For example, the access device may further directly send, to the session management network element corresponding to the first network, the identifier of the terminal, the identifier of the first network, and the information used to indicate the remaining resource. For example, the identifier of the terminal, the identifier of the first network, and the information used to indicate the remaining resource are carried in a first container, and content in the first container is transparently transmitted to the AMF network element.

Step 1304: The session management network element sends first indication information to a policy control network element, where the first indication information is used to determine the remaining resource of the terminal in the first network, or is used to indicate a relationship between the remaining resource of the terminal in the first network and a preset threshold.

It should be understood that the policy control network element in step 1304 is a policy control network element selected by the session management network element for each PDU session when the session management network element establishes a plurality of PDU sessions for the terminal in the first network. For example, if the policy control network element selected by the session management network element for a PDU session 1 and a PDU session 2 that are established by the terminal in the first network is a PCF network element 1, the policy control network element in step 1305 is the PCF network element 1. If the session management network element selects a PCF network element 1 for a PDU session 1 and selects a PCF network element 2 for a PDU session 2, the policy control network elements in step 1304 are the PCF network element 1 and the PCF network element 2.

In some embodiments, step 1303 may be implemented in the following manner: If the access device determines that the remaining resource of the terminal in the first network is less than or equal to the preset threshold, the access device sends the information about the remaining resource to the session management network element.

For example, the preset threshold may be 0 or another parameter. This is not limited in this embodiment of this application.

In some embodiments, the resource in this embodiment of this application is a guaranteed bit rate GBR resource or usage information.

In some embodiments, when the session management network element determines that the remaining resource of the terminal in the first network is less than or equal to the preset threshold, the first indication information is used to indicate that the remaining resource of the terminal in the first network is less than or equal to the preset threshold. When the session management network element determines that the remaining resource of the terminal in the first network is greater than the preset threshold, the first indication information is used to indicate that the remaining resource of the terminal in the first network is greater than the preset threshold.

Figure 14:
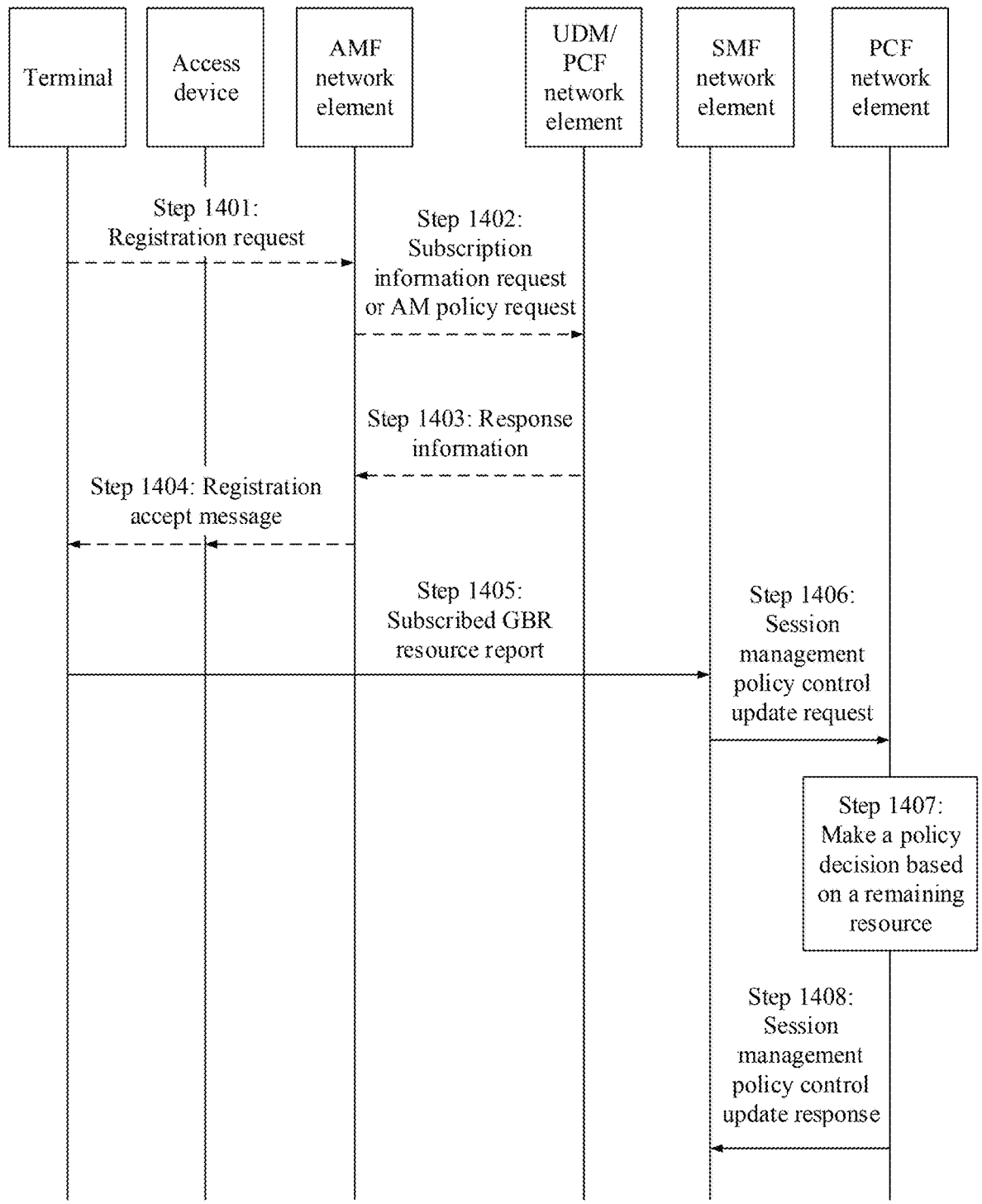
FIG. 14 is a schematic flowchart 9 of a resource information sending method according to an embodiment of this application.

With reference to FIG. 14, the following uses an example in which the method is applied to the communications system shown in FIG. 3a, the access device is the RAN shown in FIG. 3a, the session management network element may be the SMF network element shown in FIG. 3a, and the policy control network element is the PCF network element. An interaction process of a resource information sending method and an interaction process of a resource information obtaining method are described in detail. The method includes the following steps.

Step 1401: A terminal initiates a registration request (Registration Request), so that an AMF network element receives the registration request from the terminal.

The registration request carries an identifier of the terminal.

Specifically, the terminal sends the registration request to the RAN, the RAN then selects an appropriate AMF network element, and the RAN sends the registration request to the AMF network element.

Specifically, for a processing process performed by the AMF network element based on the registration request of the terminal, details are not described herein.

Step 1402: The AMF network element sends a subscription information request to UDM or sends an AM policy request to the PCF network element, so that the UDM receives the subscription information request from the AMF network element, or the PCF network element receives the AM policy request. The subscription information request or the AM policy request includes an SUPI.

The subscription information request is used to request subscription information of the terminal. The AM policy request is used to request AM-related policy information of the terminal.

Step 1403: The UDM/PCF network element feeds back response information to the AMF network element.

The response information includes a subscribed GBR of the SUPI.

It should be understood that there is another procedure in a process in which the terminal registers with a network between step 1402 and step 1403. For a specific procedure, details are not described herein.

Step 1404: The AMF network element returns a registration accept message to the terminal, and the AMF network element sends the received subscribed GBR to the RAN, so that the RAN obtains the subscribed GBR.

Step 1405: The RAN detects that the GBR resource of the terminal in a first DN and a first network slice changes, and reports a subscribed GBR resource report (Subscribed GBR Report) to the SMF network element. The subscribed GBR report carries the information used to indicate the remaining resource of the terminal in a first DN and a first network slice.

The subscribed GBR report may further carry the identifier of the terminal, an identifier of the first DN, and an identifier of the first network slice.

Step 1406: The SMF network element sends a session management policy control update request (Npcf_SMPolicyControl_Update request) to the PCF network element.

The session management policy control update request carries the information used to indicate the remaining resource of the terminal in the first DN and the first network slice.

In some embodiments, the session management policy control update request may further carry the identifier of the terminal, the identifier of the first DN, and the identifier of the first network slice.

Step 1407: The PCF network element makes a policy decision based on the remaining resource of the terminal in the first DN and the first network slice.

Step 1408: The PCF network element sends a session management policy control update response (Npcf_SMPolicyControlUpdate response) to the SMF network element.

The session management policy control update response carries policy information such as a re-formulated PCC rule when the PCF network element makes a policy decision based on the remaining resource of the terminal in the first DN and the first network slice.

It should be noted that mutual reference may be made between the embodiments of this application. For example, for same or similar steps, mutual reference may be made between the method embodiments, the communications system embodiments, and the apparatus embodiments. This is not limited.

It should be noted that when the resource is a quantity of terminals, the SMF network element in the embodiments shown in FIG. 7 to FIG. 14 may be replaced with an AMF network element. In other words, the PCF network element connected to the AMF network element interacts with the first network element. Finally, a policy generated by the PCF network element for the AMF network element based on the resource information obtained from the first network element may be rejecting registration of the terminal, or the like.

The foregoing mainly describes the solutions provided in the embodiments of this application from a perspective of interaction between network elements. It may be understood that, to implement the foregoing functions, the first network element, the access device, and the second network element include corresponding hardware structures and/or software modules for performing the functions. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that such as implementation goes beyond the scope of this application.

In the embodiments of this application, division into functional modules may be performed on the first network element, the access device, and the second network element based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in the embodiments of this application, module division is an example, and is merely logical function division. During actual implementation, another division manner may be used.

Figure 15:
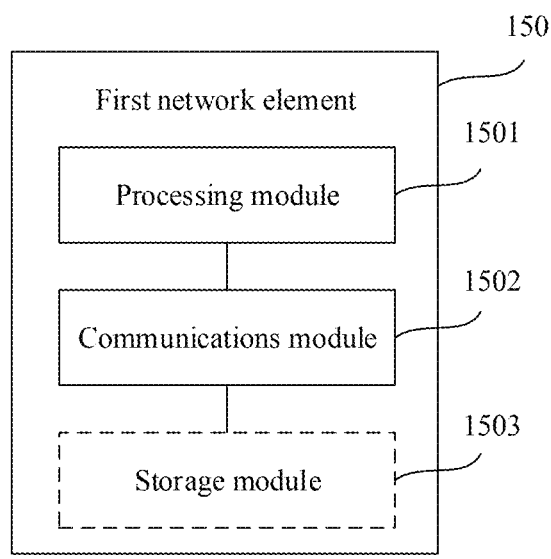
FIG. 15 is a schematic structural diagram of a first network element according to an embodiment of this application.

For example, if functional modules are obtained through division in an integrated manner, FIG. 15 is a schematic structural diagram of a first network element 150. The first network element 150 includes a processing module 1501 and a communications module 1502.

The processing module 1501 is configured to support the first network element in performing step 601 in the foregoing embodiment. The communications module 1502 is configured to support the first network element in performing step 602 in the foregoing embodiment.

All related content of the steps in the foregoing method embodiments may be cited in function descriptions of corresponding functional modules. Details are not described herein again.

In some embodiments, the first network element 150 may further include a storage module 1503. The storage module 1503 is configured to support the first network element 150 in storing information about a remaining resource of a terminal in a first network.

In this embodiment, the first network element 150 is presented in a form of functional modules obtained through division in an integrated manner. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the first network element 150 may be in a form shown in FIG. 5.

For example, the processor 401 in FIG. 5 may invoke the computer-executable instructions stored in the memory 403, to enable the first network element 150 to perform the resource sending method in the foregoing method embodiments.

Specifically, functions/implementation processes of the communications module 1502 and the processing module 1501 in FIG. 15 may be implemented by the processor 401 in FIG. 5 by invoking the computer-executable instructions stored in the memory 403. Alternatively, a function/implementation process of the processing module 1501 in FIG. 15 may be implemented by the processor 401 in FIG. 5 by invoking the computer-executable instructions stored in the memory 403, and a function/implementation process of the communications module 1502 in FIG. 15 may be implemented through the communications interface 404 in FIG. 5.

Because the first network element 150 provided in this embodiment may perform the foregoing resource sending method, for a technical effect that can be achieved by the first network element 150, refer to the foregoing method embodiments. Details are not described herein again.

Figure 16:
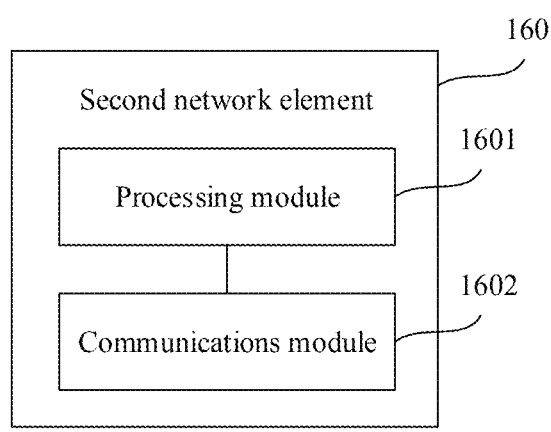
FIG. 16 is a schematic structural diagram of a second network element according to an embodiment of this application.

For example, if functional modules are obtained through division in an integrated manner, FIG. 16 is a schematic structural diagram of a second network element 160. The second network element 160 includes a processing module 1601 and a communications module 1602.

The processing module 1601 is configured to support the second network element in performing step 603 in the foregoing embodiment. The communications module 1602 is configured to support the second network element in performing step 604 in the foregoing embodiment.

All related content of the steps in the foregoing method embodiments may be cited in function descriptions of corresponding functional modules. Details are not described herein again.

In this embodiment, the second network element 160 is presented in a form of functional modules obtained through division in an integrated manner. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the second network element 160 may be in a form shown in FIG. 5.

For example, the processor 401 in FIG. 5 may invoke the computer-executable instructions stored in the memory 403, to enable the second network element 160 to perform the resource sending method in the foregoing method embodiments.

Specifically, functions/implementation processes of the communications module 1602 and the processing module 1601 in FIG. 16 may be implemented by the processor 401 in FIG. 5 by invoking the computer-executable instructions stored in the memory 403. Alternatively, a function/implementation process of the processing module 1601 in FIG. 16 may be implemented by the processor 401 in FIG. 5 by invoking the computer-executable instructions stored in the memory 403, and a function/implementation process of the communications module 1602 in FIG. 16 may be implemented through the communications interface 404 in FIG. 5.

Because the second network element 160 provided in this embodiment may perform the foregoing resource sending method, for a technical effect that can be achieved by the second network element 160, refer to the foregoing method embodiments. Details are not described herein again.

Figure 17:
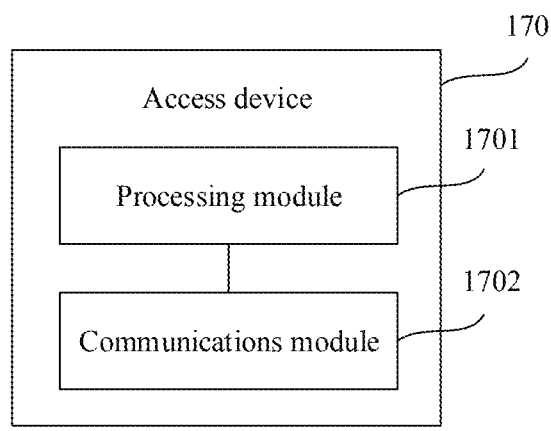
FIG. 17 is a schematic structural diagram of an access device according to an embodiment of this application.

For example, if functional modules are obtained through division in an integrated manner, FIG. 17 is a schematic structural diagram of an access device 170. The access device 170 includes a processing module 1701 and a communications module 1702.

The processing module 1701 is configured to support the access device in performing step 1302 in the foregoing embodiment. The communications module 1702 is configured to support the access device in performing step 1301 and step 1303 in the foregoing embodiment.

All related content of the steps in the foregoing method embodiments may be cited in function descriptions of corresponding functional modules. Details are not described herein again.

In this embodiment, the access device 170 is presented in a form of functional modules obtained through division in an integrated manner. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the access device 170 may be in a form shown in FIG. 5.

For example, the processor 401 in FIG. 5 may invoke the computer-executable instructions stored in the memory 403, to enable the access device 170 to perform the resource sending method in the foregoing method embodiments.

Specifically, functions/implementation processes of the communications module 1702 and the processing module 1701 in FIG. 17 may be implemented by the processor 401 in FIG. 5 by invoking the computer-executable instructions stored in the memory 403. Alternatively, a function/implementation process of the processing module 1701 in FIG. 17 may be implemented by the processor 401 in FIG. 5 by invoking the computer-executable instructions stored in the memory 403, and a function/implementation process of the communications module 1702 in FIG. 17 may be implemented through the communications interface 404 in FIG. 5.

Because the access device 170 provided in this embodiment may perform the foregoing resource sending method, for a technical effect that can be achieved by the access device 170, refer to the foregoing method embodiments. Details are not described herein again.

Figure 18:
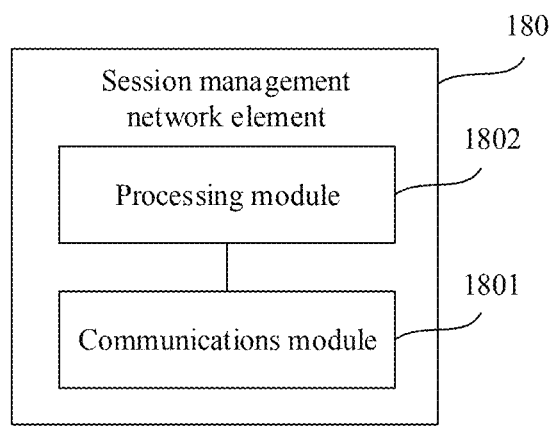
FIG. 18 is a schematic structural diagram of a session management network element according to an embodiment of this application.

For example, if functional modules are obtained through division in an integrated manner, FIG. 18 is a schematic structural diagram of a session management network element 180. The session management network element 180 includes a communications module 1801 and a processing module 1802.

The communications module 1801 supports, through the processing module 1802, the session management network element in performing step 1304 in the foregoing embodiment.

All related content of the steps in the foregoing method embodiments may be cited in function descriptions of corresponding functional modules. Details are not described herein again.

In this embodiment, the session management network element 180 is presented in a form of functional modules obtained through division in an integrated manner. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the session management network element 180 may be in a form shown in FIG. 5.

For example, the processor 401 in FIG. 5 may invoke the computer-executable instructions stored in the memory 403, to enable the session management network element 180 to perform the resource obtaining method in the foregoing method embodiments.

Specifically, functions/implementation processes of the communications module 1801 in FIG. 18 may be implemented by the processor 401 in FIG. 5 by invoking the computer-executable instructions stored in the memory 403. Alternatively, a function/implementation process of the communications module 1801 in FIG. 18 may be implemented through the communications interface 404 in FIG. 5.

Because the session management network element 180 provided in this embodiment may perform the foregoing resource sending method, for a technical effect that can be achieved by the session management network element 180, refer to the foregoing method embodiments. Details are not described herein again.

It should be understood that division into modules in the first network element, the second network element, the access device, and the session management network element is merely logical function division. During actual implementation, all or some of the modules may be integrated into a physical entity, or may be physically separated. In addition, all of the modules in the first network element, the second network element, the access device, or the session management network element may be implemented in a form of software invoked by a processing element or in the form of hardware. Alternatively, some of the modules may be implemented in a form of software invoked by a processing element, and some of the modules may be implemented in a form of hardware. For example, the modules may be separately disposed processing elements, or may be integrated into a chip of an apparatus for implementation. In addition, the modules may be stored in a memory in a form of a program, and are invoked by a processing element of the first network element, the second network element, the access device, or the session management network element invokes and execute a function of the unit. In addition, all or some of the modules may be integrated together, or may be implemented independently. The processing element described herein may be an integrated circuit with a signal processing capability. In an implementation process, the steps of the foregoing methods or the foregoing modules may be implemented by using a hardware integrated logic circuit in the processor element, or may be implemented in a form of software invoked by the processing element.

In an example, modules or units in any one of the foregoing apparatuses may be configured as one or more integrated circuits for implementing the foregoing method, for example, one or more application-specific integrated circuits (ASIC), or one or more microprocessors (DSP), or one or more field programmable gate arrays (FPGA). For another example, when a module in the first network element, the second network element, the access device, or the session management network element may be implemented in a form of scheduling a program by a processing element, the processing element may be a general-purpose processor, for example, a central processing unit (CPU) or another processor that can invoke the program. For still another example, the units may be integrated and implemented in a form of a system-on-a-chip (SOC).

The foregoing communications module may be an interface circuit or a communications interface of the apparatus, and is configured to receive a signal from another apparatus. For example, when the apparatus is implemented as a chip, the communications module is an interface circuit or a communications interface that is of the chip and that is configured to receive a signal from another chip or apparatus or send a signal.

Figure 19:
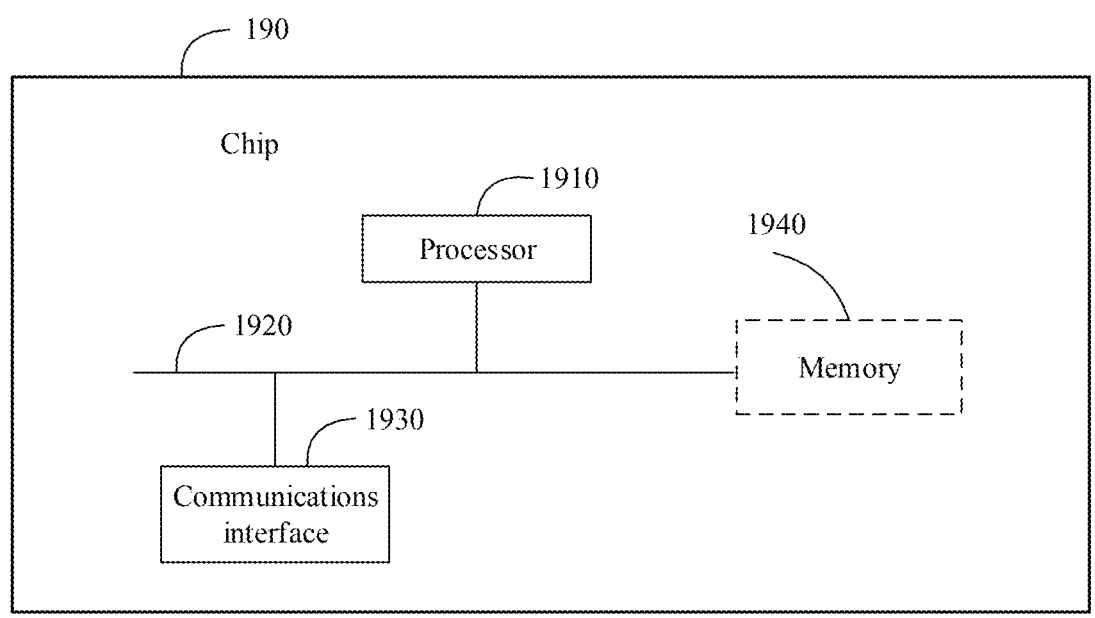
FIG. 19 is a schematic diagram of a chip according to an embodiment of this application.

FIG. 19 is a schematic structural diagram of a chip 190 according to an embodiment of this application. The chip 190 includes at least one processor 1910 and a communications interface 1930.

In some embodiments, the chip 190 further includes a memory 1940. The memory 1940 may include a read-only memory and a random access memory, and provide operation instructions and data for the processor 1910. A part of the memory 1940 may further include a nonvolatile random access memory (NVRAM).

In some implementations, the memory 1940 stores the following elements: an executable module or a data structure, or a subset thereof, or an extension set thereof.

In this embodiment of this application, a corresponding operation is performed by invoking the operation instructions (where the operation instructions may be stored in an operating system) stored in the memory 1940.

In a possible implementation, structures of chips used by the first network element, the second network element, the access device, and the session management network element are similar, and different apparatuses may use different chips to implement respective functions.

The processor 1910 controls an operation of the first network element, the second network element, the access device, or the session management network element. The processor 1910 may also be referred to as a CPU (central processing unit, central processing unit). The memory 1940 may include a read-only memory and a random access memory, and provide instructions and data for the processor 1910. A part of the memory 1940 may further include a nonvolatile random access memory (NVRAM). In a specific application, the memory 1940, the communications interface 1930, and the memory 1940 are coupled together through a bus system 1920. The bus system 1920 may further include a power bus, a control bus, a status signal bus, and the like in addition to a data bus. However, for clarity of description, various buses are denoted as the bus system 1920 in FIG. 19.

The resource information sending method or the resource information obtaining method disclosed in the foregoing embodiments of this application may be applied to the processor 1910, or may be implemented by the processor 1910. The processor 1910 may be an integrated circuit chip and has a signal processing capability. In an implementation process, steps of the foregoing resource information sending method or the foregoing resource information obtaining method may be implemented by using a hardware integrated logic circuit in the processor 1910 or instructions in a form of software. The processor 1910 may be a general-purpose processor, a digital signal processor (DSP), an application-specific integrated circuit (ASIC), a field-programmable gate array (FPGA) or another programmable logic device, a discrete gate or transistor logic device, or a discrete hardware component. The processor may implement or perform the methods, the steps, and the logical block diagrams that are disclosed in the embodiments of this application. The general-purpose processor may be a microprocessor, any processor, or the like. The steps of the methods disclosed with reference to the embodiments of this application may be directly presented as being performed and completed by a hardware decoding processor, or performed and completed by a combination of hardware and a software module in a decoding processor. A software module may be located in a mature storage medium in the art, such as a random access memory, a flash memory, a read-only memory, a programmable read-only memory, an electrically erasable programmable memory, or a register. The storage medium is located in the memory 1940, and the processor 1910 reads information in the memory 1940 and completes the steps in the foregoing methods in combination with hardware of the processor.

In some embodiments, the communications interface 1930 is configured to perform receiving and sending steps of the first network element, the second network element, the access device, or the session management network element in the embodiments shown in FIG. 6 to FIG. 14.

The processor 1910 is configured to perform a processing step of the first network element, the second network element, the access device, or the session management network element in the embodiments shown in FIG. 6 to FIG. 14.

In the foregoing embodiments, the instructions that are stored in the memory and that are to be executed by the processor may be implemented in a form of a computer program product. The computer program product may be written into the memory in advance, or may be downloaded in a form of software and installed in the memory.

The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

According to an aspect, a computer storage medium is provided. The computer-readable storage medium stores instructions. When the instructions are run, a first network element or a chip used in a first network element is enabled to perform step 601 and step 602 in the embodiment, and/or is configured to perform another process performed by the first network element or the chip used in the first network element in the technology described in this specification.

According to another aspect, a computer storage medium is provided. The computer-readable storage medium stores instructions. When the instructions are run, a second network element or a chip used in a second network element is enabled to perform step 603 and step 604 in the embodiment, and/or is configured to perform another process performed by the second network element or the chip used in the second network element in the technology described in this specification.

According to still another aspect, a computer storage medium is provided. The computer-readable storage medium stores instructions. When the instructions are run, an access device or a chip used in an access device is enabled to perform step 1301, step 1302, and step 1303 in the embodiment, and/or is configured to perform another process performed by the access device or the chip used in the access device in the technology described in this specification.

According to still another aspect, a computer storage medium is provided. The computer-readable storage medium stores instructions. When the instructions are run, a session management network element or a chip used in a session management network element is enabled to perform step 1304 in the embodiment, and/or is configured to perform another process performed by the session management network element or the chip used in the session management network element in the technology described in this specification.

The foregoing readable storage medium may include any medium that can store program code, such as a USB flash drive, a removable hard disk, a read-only memory, a random access memory, a magnetic disk, or an optical disc.

According to an aspect, a computer program product including instructions is provided. The computer program product stores the instructions. When the instructions are run, a first network element or a chip used in a first network element is enabled to perform step 601 and step 602 in the embodiment, and/or is configured to perform another process performed by the first network element or the chip used in the first network element in the technology described in this specification.

According to another aspect, a computer program product including instructions is provided. The computer program product stores the instructions. When the instructions are run, a second network element or a chip used in a second network element is enabled to perform step 603 and step 604 in the embodiment, and/or is configured to perform another process performed by the second network element or the chip used in the second network element in the technology described in this specification.

According to still another aspect, a computer program product including instructions is provided. The computer program product stores the instructions. When the instructions are run, an access device or a chip used in an access device is enabled to perform step 1301, step 1302, and step 1303 in the embodiment, and/or is configured to perform another process performed by the access device or the chip used in the access device in the technology described in this specification.

According to still another aspect, a computer program product including instructions is provided. The computer program product stores the instructions. When the instructions are run, a session management network element or a chip used in a session management network element is enabled to perform step 1304 in the embodiment, and/or is configured to perform another process performed by the session management network element or the chip used in the session management network element in the technology described in this specification.

According to an aspect, a chip is provided. The chip is used in a first network element. The chip includes at least one processor and a communications interface. The communications interface is coupled to the at least one processor. The processor is configured to run instructions to perform step 601 and step 602 in the embodiment, and/or is configured to perform another process performed by the first network element in the technology described in this specification.

According to another aspect, a chip is provided. The chip is used in a second network element. The chip includes at least one processor and a communications interface. The communications interface is coupled to the at least one processor. The processor is configured to run instructions to perform step 603 and step 604 in the embodiment, and/or is configured to perform another process performed by the second network element in the technology described in this specification.

According to still another aspect, a chip is provided. The chip is used in an access device. The chip includes at least one processor and a communications interface. The communications interface is coupled to the at least one processor. The processor is configured to run instructions to perform step 1301, step 1302, and step 1303 in the embodiment, and/or is configured to perform another process performed by the access device in the technology described in this specification.

According to still another aspect, a chip is provided. The chip is used in a session management network element. The chip includes at least one processor and a communications interface. The communications interface is coupled to the at least one processor. The processor is configured to run instructions to perform step 1304 in the embodiment, and/or is configured to perform another process performed by the session management network element in the technology described in this specification.

Although this application is described with reference to specific features and the embodiments thereof, it is clear that various modifications and combinations may be made to them without departing from the spirit and scope of this application. Correspondingly, the specification and the accompanying drawings are merely descriptions of examples of this application defined by the appended claims, and are considered as any of or all modifications, variations, combinations, or equivalents that cover the scope of this application. Clearly, a person skilled in the art can make various modifications and variations to this application without departing from the spirit and scope of this application. This application is intended to cover these modifications and variations of this application, provided that they fall within the scope of protection defined by the following claims and their equivalent technologies in this application.

What is claimed is:

1. A resource information sending method, comprising:
    receiving, by a first network element comprising a first processor and a first non-transitory computer-readable storage medium which is coupled to the first processor, information indicating a remaining resource of a terminal in a first network slice from a second policy control network element, wherein the remaining resource is a subscribed resource currently available to the terminal in the first network slice;
    storing, by the first network element, the information indicating the remaining resource of the terminal in the first network slice; and
    sending, by the first network element to a first policy control network element providing a service for the terminal in the first network slice, the information indicating the remaining resource of the terminal in the first network slice,
    wherein each of the first policy control network element, the second policy control network element, the terminal and the first network element are different devices from each other.

2. The method according to claim 1, further comprising:
    receiving, by the first network element, an identifier of the first network slice from the second policy control network element; and
    storing, by the first network element, the identifier of the first network slice with the information indicating the remaining resource of the terminal.

3. The method according to claim 2, wherein the receiving, by the first network element, the identifier of the first network slice and the receiving, by the first network element, the information indicating the remaining resource from the second policy control network element comprises:
    receiving, by the first network element, a first operation request of a data management creation service or a second operation request of a data management update service from the second policy control network element, wherein the first operation request or the second operation request comprises the identifier of the first network slice and the information indicating the remaining resource.

4. The method according to claim 1, wherein the first network element is one of a unified data repository (UDR), a unified data management (UDM), or a binding support function (BSF).

5. The method according to claim 1, wherein
the first policy control network element is a policy control network element that is other than the second policy control network element and that corresponds to the first network slice, or
the first policy control network element is a policy control network element that subscribes to a remaining resource change notification from the first network element and that corresponds to the first network slice.

6. The method according to claim 5, wherein the sending, by the first network element to the first policy control network element, the information indicating the remaining resource comprises:
in response to the first network element determining that the first policy control network element exists in the policy control network element corresponding to the first network slice, sending, by the first network element to the first policy control network element, the information indicating the remaining resource.

7. The method according to claim 1, wherein the remaining resource is a guaranteed bit rate (GBR) resource, usage information, or attribute information of the first network slice.

8. The method according to claim 1, further comprising:
sending, to the first network element, the information indicating the remaining resource of the terminal in the first network slice.

9. The method according to claim 8, further comprising:
obtaining a resource that has been allocated to the terminal in the first network slice; and
determining the remaining resource of the terminal in the first network slice according to the resource that has been allocated to the terminal in the first network slice.

10. A first network element, comprising:
at least one processor; and
a non-transitory computer-readable storage medium coupled to the at least one processor and configured to store instructions, the at least one processor being configured to execute the instructions to cause the first network element to:
receive information indicating a remaining resource of a terminal in a first network slice from a second policy control network element, wherein the remaining resource is a subscribed resource currently available to the terminal in the first network slice;
store the information indicating the remaining resource of the terminal in the first network slice; and
send, to a first policy control network element providing a service for the terminal in the first network slice, the information indicating the remaining resource of the terminal in the first network slice,
wherein each of the first policy control network element, the second policy control network element, the terminal and the first network element are different devices from each other.

11. The first network element according to claim 10, wherein the at least one processor is configured to execute the instructions to further cause the first network element to:
receive an identifier of the first network slice from the second policy control network element; and
store the identifier of the first network slice with the information indicating the remaining resource of the terminal.

12. The first network element according to claim 11, wherein the at least one processor is configured to execute the instructions to further cause the first network element to:
receive a first operation request of a data management creation service or a second operation request of a data management update service from the second policy control network element, wherein the first operation request or the second operation request comprises the identifier of the first network slice and the information indicating the remaining resource.

13. The first network element according to claim 10, wherein the remaining resource is a guaranteed bit rate (GBR) resource, usage information, or attribute information of the first network slice.

14. The first network element according to claim 10, wherein the first network element is one of a unified data repository (UDR), a unified data management (UDM), or a binding support function (BSF).

15. A communications system, comprising: a first network element and a second policy control network element, wherein
the second policy control network element comprises at least one first processor and a first non-transitory computer-readable storage medium which is coupled to the at least one first processor, and the first non-transitory computer-readable storage medium is configured to store first instructions, the at least one first processor being configured to execute the first instructions to cause the second policy control network element to:
send, to the first network element, information indicating a remaining resource of a terminal in a first network slice, and the remaining resource is a subscribed resource currently available to the terminal in the first network slice, and
the first network element comprises at least one second processor and a second non-transitory computer-readable storage medium which is coupled to the at least one second processor, and the second non-transitory computer-readable storage medium is configured to store second instructions, the at least one second processor being configured to execute the second instructions to cause the first network element to:
receive the information indicating the remaining resource of the terminal in the first network slice,
store the information indicating the remaining resource of the terminal in the first network slice, and
send, to a first policy control network element providing a service for the terminal in the first network slice, the information indicating the remaining resource of the terminal in the first network slice,
wherein each of the first policy control network element, the second policy control network element, the terminal and the first network element are different devices from each other.

16. The system according to claim 15, wherein
the at least one first processor is configured to execute the first instructions to further cause the second policy control network element to send an identifier of the first network slice to the first network element; and
the at least one second processor is configured to execute the second instructions to further cause the first network element to receive the identifier of the first network slice, and store the identifier of the first network slice with the information indicating the remaining resource of the terminal.

17. The system according to claim 16, wherein
the at least one second processor is configured to execute the second instructions to further cause the first network element to receive a first operation request of a data management creation service or a second operation request of a data management update service from the second policy control network element, wherein the first operation request of the data management creation service or the second operation request of the data management update service comprises the identifier of the first network slice and the information indicating the remaining resource; and
the at least one first processor is configured to execute the first instructions to further cause the second policy control network element to send the first operation request or the second operation request to the first network element.

18. The system according to claim 15, wherein the resource is a guaranteed bit rate (GBR) resource, usage information, or attribute information of the first network slice.

19. The system according to claim 15, wherein the first network element is one of a unified data repository (UDR), a unified data management (UDM), or a binding support function (BSF).

20. The system according to claim 15, wherein
the first policy control network element is a policy control network element that is other than the second policy control network element and that is corresponding to the first network slice, or
the first policy control network element is a policy control network element that subscribes to a remaining resource change notification from the first network element and that is corresponding to the first network slice.

21. The system according to claim 15, wherein the at least one first processor is configured to execute the first instructions to further cause the second policy control network element to:
obtain a resource that has been allocated to the terminal in the first network slice; and
determine the remaining resource of the terminal in the first network slice according to the resource that has been allocated to the terminal in the first network slice.

* * * * *